United States Patent
Blaha, Jr. et al.

(10) Patent No.: US 10,716,090 B2
(45) Date of Patent: *Jul. 14, 2020

(54) METHOD OF CONSIDERING THE POSITIONS OF DATA POINTS IN RELATION TO BOUNDARIES REPRESENTED IN A GEOGRAPHIC INFORMATION SYSTEM DATABASE, IN ESTIMATING LOCATION

(71) Applicant: Polaris Wireless, Inc., Mountain View, CA (US)

(72) Inventors: Jerome Arthur Blaha, Jr., Redwood City, CA (US); Scot Douglas Gordon, Redmond, CA (US); Jonathan Shiao-en Lu, San Jose, CA (US); Jeffrey Noel Wu, Santa Clara, CA (US); Jian Jet Zhu, Tustin, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,114

(22) Filed: Jan. 15, 2020

(65) Prior Publication Data

US 2020/0187148 A1    Jun. 11, 2020

Related U.S. Application Data

(63) Continuation of application No. 16/353,598, filed on Mar. 14, 2019, now Pat. No. 10,602,477.
(Continued)

(51) Int. Cl.
*H04W 64/00* (2009.01)
*H04W 4/30* (2018.01)
(Continued)

(52) U.S. Cl.
CPC .......... *H04W 64/003* (2013.01); *G06F 16/29* (2019.01); *H04W 4/021* (2013.01); *H04W 4/30* (2018.02); *H04W 4/33* (2018.02)

(58) Field of Classification Search
CPC ......... H04W 4/33; H04W 4/30; H04W 4/021; H04W 64/003; G06F 16/29
(Continued)

(56) References Cited

U.S. PATENT DOCUMENTS 7,120,449 B1 * 10/2006 Muhonen .............. H04W 64/00
                                                          455/456.1
8,330,654 B2    12/2012 Lo et al.
(Continued)

OTHER PUBLICATIONS

USPTO "Notice of Allowance and Fee(s) Due" dated May 2, 2019, U.S. Appl. No. 16/047,168.
(Continued)

*Primary Examiner* — William Nealon
(74) *Attorney, Agent, or Firm* — McGeary Cukor LLC; Kenneth Ottesen; Jason Paul DeMont

(57) ABSTRACT

A technique for the estimation of the location of a wireless terminal. The disclosed technique considers boundaries that are represented in a geographic information system (GIS) database in combination with a first, unenhanced estimate of location, in order to generate a second, enhanced estimate of location. To do so, the technique generates a point cloud based on the first estimate of location. At least some of the data points in the point cloud are then removed, depending on their positions in relation to certain boundaries stored in the GIS database, such as the exterior walls of buildings and other structures. By considering these boundaries, the disclosed technique can increase the probability that the estimated location is within an area that is occupiable by a person, thereby providing a more reasonable result. The
(Continued)

technique generates the second, enhanced estimate based on the distribution of the remaining data points.

20 Claims, 15 Drawing Sheets

Related U.S. Application Data

(60) Provisional application No. 62/653,192, filed on Apr. 5, 2018.

(51) Int. Cl.
*G06F 16/29* (2019.01)
*H04W 4/021* (2018.01)
*H04W 4/33* (2018.01)

(58) Field of Classification Search
USPC ...................................................... 455/456.1
See application file for complete search history.

(56) References Cited

U.S. PATENT DOCUMENTS

| | | | | |
|---|---|---|---|---|
| 8,493,205 B2 * | 7/2013 | Bhattacharya | ........... | G08B 1/08 340/539.13 |
| 9,344,854 B2 | 5/2016 | Hong et al. | | |
| 2006/0095349 A1 * | 5/2006 | Morgan | .................... | G01S 5/02 705/29 |
| 2009/0234580 A1 * | 9/2009 | Fernandez-Hernandez | ................. | G01C 21/30 701/436 |
| 2011/0032152 A1 * | 2/2011 | Lo | ........... | G01C 21/28 342/450 |
| 2013/0178231 A1 * | 7/2013 | Morgan | ................ | G01S 5/0278 455/456.1 |
| 2014/0018111 A1 * | 1/2014 | Farley | .................... | H04W 4/023 455/456.6 |
| 2014/0378166 A1 * | 12/2014 | Hong | .................... | H04W 4/021 455/456.3 |
| 2015/0319575 A1 * | 11/2015 | Chen | .................... | H04W 4/023 455/456.3 |
| 2016/0057572 A1 * | 2/2016 | Bojorquez Alfaro | ........................ | H04W 4/021 455/411 |
| 2018/0014161 A1 | 1/2018 | Warren et al. | | |

OTHER PUBLICATIONS

USPTO Office action dated Sep. 24, 2019, U.S. Appl. No. 16/353,598.
USPTO "Notice of Allowance and Fee(s) Due" dated Dec. 10, 2019, U.S. Appl. No. 16/353,598.

* cited by examiner

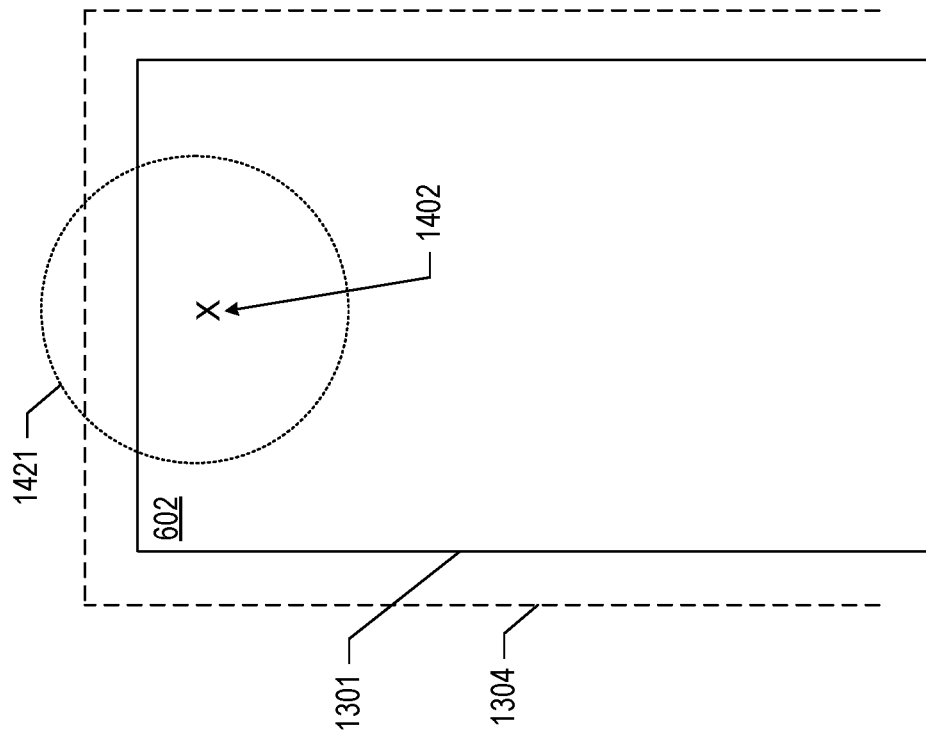
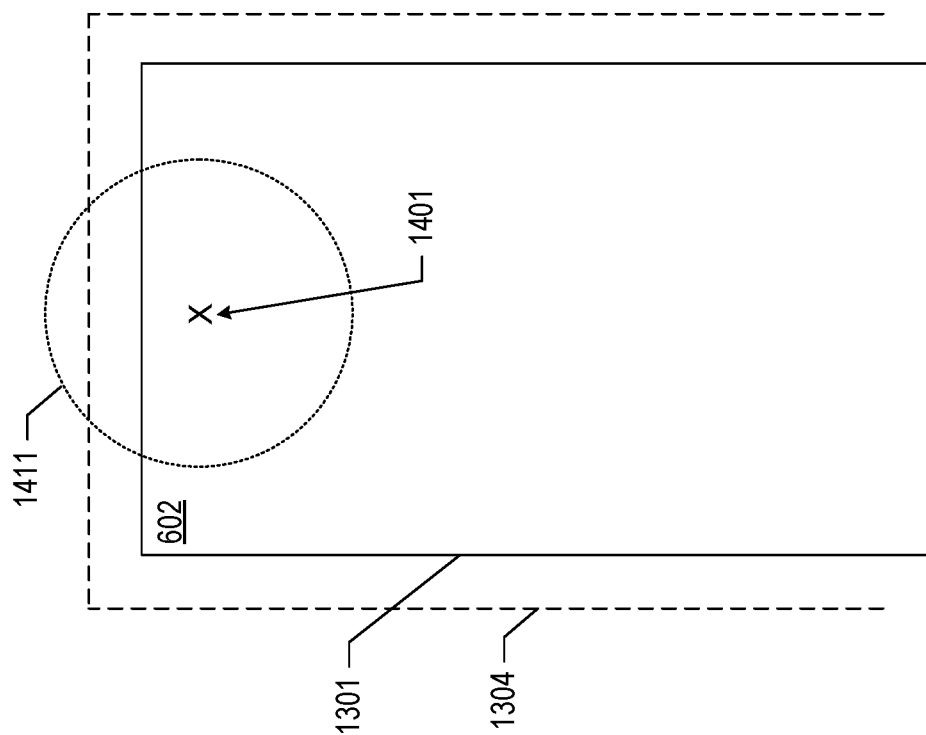

METHOD OF CONSIDERING THE POSITIONS OF DATA POINTS IN RELATION TO BOUNDARIES REPRESENTED IN A GEOGRAPHIC INFORMATION SYSTEM DATABASE, IN ESTIMATING LOCATION

CROSS REFERENCE TO RELATED APPLICATIONS

The following document is incorporated by reference herein: U.S. Provisional Application Ser. No. 62/653,192, filed Apr. 5, 2018. If there are any contradictions or inconsistencies in language between this application and any document that has been incorporated by reference that might affect the interpretation of the claims in this application, the claims in this application should be interpreted to be consistent with the language in this application. This application is also related to "Method of Considering Boundaries Represented in a Geographic Information System Database, in Estimating Location," U.S. application Ser. No. 16/353,598, incorporated by reference herein.

FIELD OF THE INVENTION

The present invention relates to telecommunications in general and, more particularly, to a technique for enhancing an estimate of the location of a wireless terminal by considering boundaries that are represented in a geographic information system (GIS) database, including the exterior walls of buildings and other structures.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

SUMMARY OF THE INVENTION

In certain radio frequency (RF) propagation environments, it is unfortunately not uncommon for a first location estimation technique to report a wireless terminal as being at a first location, even though it might be unlikely for other reasons that the wireless terminal is at that first location. For example, in some urban RF propagation environments, a first location method might estimate the wireless terminal as being outside the twentieth floor of a building—even though it is unlikely that a wireless terminal, especially while in the possession of a person, is suspended in midair over 200 feet above the ground. In contrast, an estimate that corresponds to a location within an occupiable area—that is, an area that a person is capable of occupying, such as office space within the building—would be a more reasonable estimate. Therefore, a technique is needed that ameliorates or eliminates erroneous estimates of a wireless terminal's location.

The present invention enables an improved estimation of the location of a wireless terminal, over at least some techniques in the prior art. In accordance with the illustrative embodiment, a technique disclosed herein considers boundaries that are represented in a geographic information system (GIS) database in combination with a first, unenhanced estimate of location, in order to generate a second, enhanced estimate of location. By considering certain boundaries whose positions are stored in the GIS database, such as the exterior walls of buildings and other structures, the disclosed technique can increase the probability that the estimated location is within an occupiable area, thereby providing a more reasonable result.

In accordance with the illustrative embodiment, a location engine uses the disclosed technique to obtain a latitude-longitude estimate and an elevation (i.e., z-axis) estimate of a particular wireless terminal, which include geographical coordinates that constitute a first estimate of location. The first estimate of location also includes an uncertainty in the one or more geographical coordinates. The first estimate of location can be based on one or more techniques, including RF pattern matching, barometric-based estimation, Global Navigation Satellite System (GNSS), and so on. Then, the location engine generates the data points that make up a nonempty set of data points in space, based on one or more probability distributions. The probability distributions are defined by at least one of i) one or more geographical coordinates and ii) the uncertainty in the one or more geographical coordinates. In accordance with the illustrative embodiment, each probability distribution along each dimension (x, y, and z) is a normal distribution. The data points that are generated embody a point cloud, with the x, y, and z coordinates in the first estimate defining the center of the point cloud and the uncertainty defining the standard deviation of the data point distributions in the point cloud. Qualitatively, the point cloud is denser toward its center and sparser away from the center.

The location engine of the illustrative embodiment then assigns weights to the data points in the point cloud, based on the position of each data point to which a respective weight is assigned in relation to one or more objects represented in a geographic information system (GIS) database, such as the exterior walls of buildings or other structures. In accordance with the illustrative embodiment, the weights that are assigned represent the "probabilities of survival" of the data points, which alludes to a test that is subsequently performed and described below. For example, high probabilities of survival can be assigned to data points in areas that correspond to positions that are within and immediately adjacent to a building, and low probabilities of survival can be assigned to data points further away from the building.

The location engine then compares each data point's probability of survival to a randomly-generated value for that data point and, depending on the result, removes the data point from the point cloud, resulting in a nonempty proper subset of the data points. The location engine then generates a second, enhanced estimate of the location of the wireless terminal based on the remaining data points in the proper subset. For example, the median coordinate value along each dimension (x, y, z) of the remaining data points can be used as the corresponding coordinate value in the second, enhanced estimate.

The technique of the illustrative embodiment, in combination with a judicious assigning of different probabilities of survival to data points existing at different positions in relation to the building or structure, has the effect of "dragging" the estimated location of the wireless terminal toward the inside of the building, or, in general, toward an occupiable area in which a person is more likely to be.

A first illustrative method of estimating the location of a wireless terminal comprises: receiving, by a data-processing system, a first estimate of location of a wireless terminal, the first estimate comprising i) one or more geographical coordinates, and ii) an uncertainty in the one or more geographical coordinates; generating, by the data-processing system, data points in a nonempty set of data points in space, based on one or more probability distributions that are defined by at least one of i) the one or more geographical coordinates and ii) the uncertainty in the one or more geographical coordinates; assigning, by the data-processing system, weights to the data points in the set of data points, based on the position of each data point to which a respective weight is assigned in relation to one or more objects represented in a geographic information system (GIS) database; removing, by the data-processing system, at least one of the data points from the set of data points, based on the weights of the data points, resulting in a nonempty proper subset of the data points; and generating, by the data-processing system, a second estimate of location of the wireless terminal based on the proper subset of the data points.

A second illustrative method of estimating the location of a wireless terminal comprises: receiving, by a data-processing system, a first estimate of location of a wireless terminal, the first estimate comprising a first geographic coordinate value along a first dimension and a second geographical coordinate value along a second dimension; generating, by the data-processing system, data points in a nonempty set of data points in space, based on i) a first normal distribution that is defined by the first geographic coordinate value and ii) a second normal distribution that is defined by the second geographic coordinate value, wherein the data points are represented by coordinate values along the first and second dimensions; assigning, by the data-processing system, weights to the data points in the set of data points, based on the position of each data point to which a respective weight is assigned in relation to one or more objects represented in a geographic information system (GIS) database; removing, by the data-processing system, at least one of the data points from the set of data points, based on the weights of the data points, resulting in a nonempty proper subset of the data points; and generating, by the data-processing system, a second estimate of location of the wireless terminal based on determining, amongst the proper subset of data points, i) a median of the coordinate values along the first dimension and ii) a median of the coordinate values along the second dimension.

A third illustrative method of estimating the location of a wireless terminal comprises: receiving, by a data-processing system, a first estimate of location of a wireless terminal, the first estimate comprising a first geographic coordinate value and a second geographical coordinate value; generating, by the data-processing system, data points in a nonempty set of data points in space, based on i) a first normal distribution that is defined by the first geographic coordinate value and ii) a second normal distribution that is defined by the second geographic coordinate value; assigning, by the data-processing system, weights to the data points in the set of data points, based on the position of each data point to which a respective weight is assigned in relation to an exterior wall of a building represented in a geographic information system (GIS) database; removing, by the data-processing system, at least one of the data points from the set of data points, based on the weights of the data points, resulting in a nonempty proper subset of the data points; and generating, by the data-processing system, a second estimate of location of the wireless terminal based on the proper subset of the data points.

BRIEF DESCRIPTION OF THE DRAWINGS

FIGS. 14A and 14B depict a first example of how location engine 113 generates the second estimate of location of wireless terminal 101.

FIGS. 15A and 14B depict a second example of how location engine 113 generates the second estimate of location of wireless terminal 101.

DEFINITIONS

Figure 1:
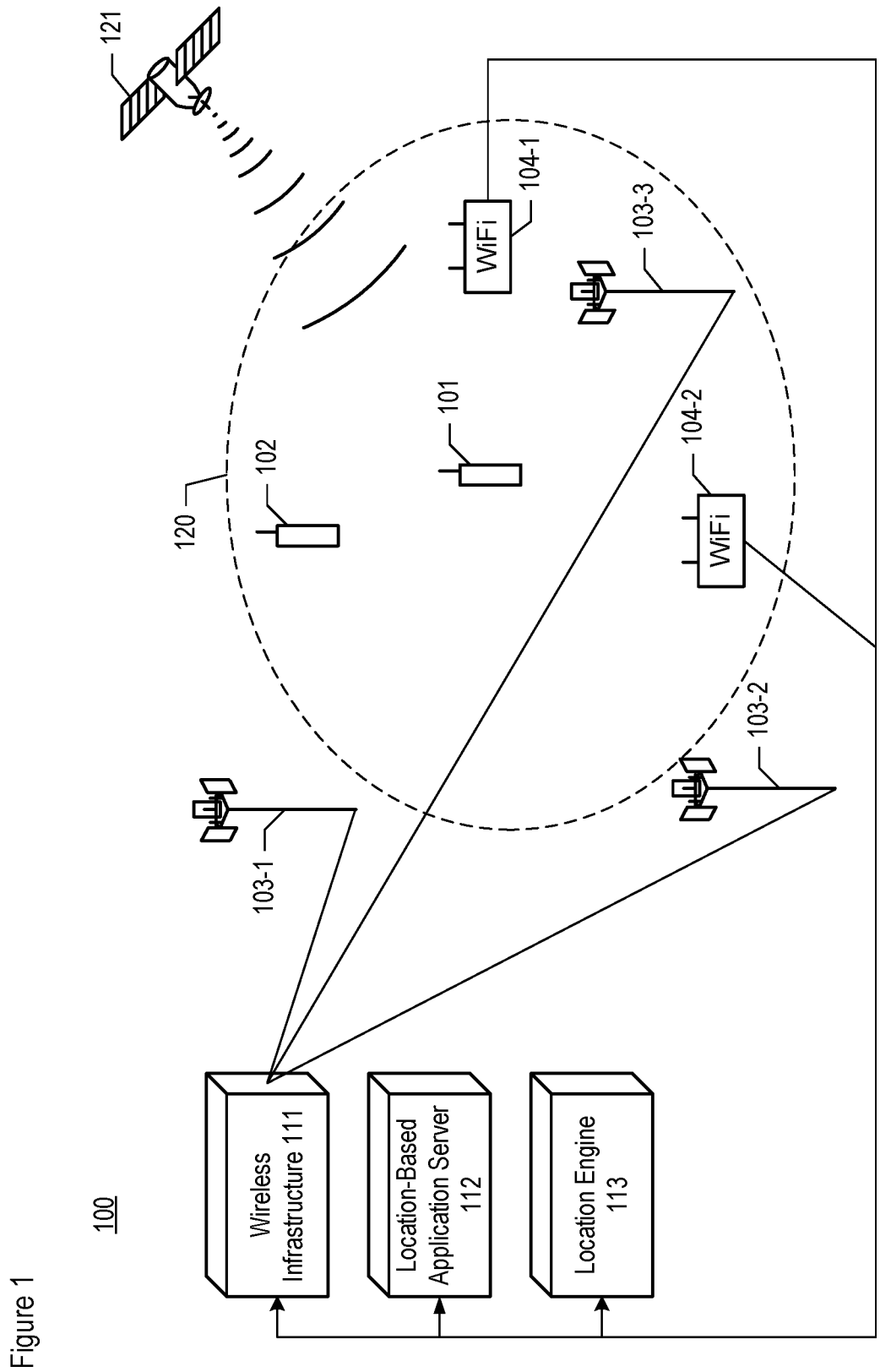
FIG. 1 depicts a diagram of the salient components of wireless telecommunications system 100 in accordance with the illustrative embodiment of the present invention.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Geographic Information System—For the purposes of this specification, the phrase "geographic information system (GIS)" is defined as a system designed to capture, store, manipulate, analyze, manage, and present spatial or geographic data.

Identity of a Radio Signal—For the purposes of this specification, the phrase "identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, location-dependent information can be:
  i. a measurement of a location-dependent trait (e.g., signal strength, etc.) of a radio signal as received by the wireless terminal,
  ii. the identity of a radio signal as received by the wireless terminal (e.g., in a service environment in which different radio signals transmitted from different locations are assigned different identities, etc.), or
  iii. the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
  i. the location of the transmitter of the signal, or
  ii. the location of the receiver of the signal, or
  iii. both i and ii.
For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:
  i. one or more location-dependent traits of one or more radio signals received or transmitted by a wireless terminal, or
  ii. the identity of one or more radio signals received or transmitted by a wireless terminal, or
  iii. both i and ii,
at each of a plurality of locations.

Processor—For the purposes of this specification, a "processor" is defined as hardware or hardware and software that performs mathematical and/or logical operations.

Probability Distribution—For the purposes of this specification, a "probability distribution" is defined as a description (e.g., a mathematical function, etc.) of a random phenomenon in terms of probabilities of events.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT) device, a computer, and any other type of device capable of operating in a wireless environment are examples of wireless terminals.

DETAILED DESCRIPTION

Wireless Telecommunications System 100—FIG. 1 depicts a diagram of the salient components of wireless telecommunications system 100 in accordance with the illustrative embodiment of the present invention. Wireless telecommunications system 100 comprises: wireless terminals 101 and 102, cellular base stations 103-1, 103-2, and 103-3, Wi-Fi base stations 104-1 and 104-2, wireless infrastructure 111, location-based application server 112, location engine 113, and Global Positioning System (GPS) constellation 121, interrelated as shown.

Wireless infrastructure 111, location-based application server 112, location engine 113 (hereinafter "location engine 113"), and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminals 101 and 102 are devices that provide bi-directional voice, data, and video telecommunications services to their respective users (not shown). Terminals 101 and 102 also perform the processes described below and in the accompanying figures, including reporting of the service set identifier (SSID), media access control (MAC) address, and possibly other identifiers in a wireless network (e.g., wireless local area network [WLAN], etc.) that is being accessed by the wireless terminals within system 100. Terminals 101 and 102 comprise the hardware and software necessary to do the aforementioned tasks. Furthermore, wireless terminals 101 and 102 are mobile and can be at any location within geographic region 120 at any time.

Wireless terminals 101 and 102 provide the aforementioned telecommunications services to their respective users and perform the aforementioned tasks. It will, however, be clear to those skilled in the art, after reading this disclosure, how to make and use embodiments of the present invention in which wireless terminals 101 and 102 provide a different set of services or perform a different set of tasks.

In accordance with the illustrative embodiment, wireless terminals 101 and 102 can receive one or more radio signals from each of base stations 103-1, 103-2, and 103-3, Wi-Fi base stations 104-1 and 104-2, and GPS constellation 121, in well-known fashion. Wireless terminals 101 and 102 are also capable of identifying each radio signal it receives, in well-known fashion, and of transmitting the identity of each signal it receives to location engine 113. Both wireless terminals are further capable of measuring one or more location-dependent traits of each radio signal they receive, in well-known fashion, and of transmitting each measurement they generate to location engine 113. Both wireless terminals also can measure a difference of a location-dependent trait of two signals they each receive, in well-known fashion, and of transmitting such measurements to location engine 113. As those who are skilled in the art will appreciate after reading this specification, wireless terminals 101 and 102 can use technologies other than WiFi and GPS for location purposes in some other embodiments of the present invention.

In accordance with the illustrative embodiment, wireless terminals 101 and 102 can transmit one or more radio signals—that can be received by one or more of base stations 103-1, 103-2, and 103-3 and Wi-Fi base stations 104-1 and 104-2—in accordance with specific parameters (e.g., signal strength, frequency, coding, modulation, etc.), in well-known fashion, and of transmitting those parameters to location engine 113.

In accordance with the illustrative embodiment, and as described in detail below, wireless terminals 101 and 102 each comprise a barometer (shown in FIG. 2 as barometer 205). Accordingly, wireless terminals 101 and 102 are capable of measuring (e.g., periodically, sporadically, and on-demand) the barometric pressure, in well-known fashion, and of transmitting the measurements to location engine 113. As those who are skilled in the art will appreciate after reading this specification, at least some embodiments of the present invention can be made and used without a barometer being present at one or more of the wireless terminals.

Although the illustrative embodiment depicts wireless telecommunications system 100 as comprising two wireless terminals, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline and with wireless terminals 101 and 102 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and to perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

i. receiving one or more radio signals transmitted by wireless terminals 101 and 102, and ii. identifying each radio signal transmitted by wireless terminals 101 and 102, in well-known fashion, and of transmitting the identity of those signals to location engine 113, and iii. measuring one or more location-dependent traits of each radio signal transmitted by wireless terminals 101 and 102, in well-known fashion, and of transmitting the measurements to location engine 113, and iv. transmitting one or more signals to wireless terminals 101 and 102 in accordance with specific parameters (e.g., signal strength, frequency, coding, modulation, etc.), in well-known fashion, and of transmitting those parameters to location engine 113, and v. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminals 101 and 102 via radio in well-known fashion and in accordance with a WiFi protocol. As is well known to those skilled in the art, base stations are also commonly referred to by a variety of alternative names such as access points, nodes, network interfaces, etc. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:

i. receiving one or more radio signals transmitted by wireless terminals 101 and 102, and ii. identifying each radio signal transmitted by wireless terminals 101 and 102, in well-known fashion, and of transmitting the identity of those signals to location engine 113, and iii. measuring one or more location-dependent traits of each radio signal transmitted by wireless terminals 101 and 102, in well-known fashion, and of transmitting the measurements to location engine 113, and iv. transmitting one or more signals to wireless terminals 101 and 102 in accordance with specific parameters (e.g., signal strength, frequency, coding, modulation, etc.), in well-known fashion, and of transmitting those parameters to location engine 113, and v. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminals 101 and 102 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminals 101 and 102—generated by location engine 113—in a location-based application, in well-known fashion. Location-based applications are well-known in the art and provide services such as, and without limitation, E-911 routing, navigation, location-based advertising, weather alerts. In accordance with the illustrative embodiment, location-based application server 112 is implemented on a data-processing system made up of one or more server computers.

Location engine 113 is a data processing system that comprises hardware and software that generates one or more estimates of the locations of wireless terminals 101 and 102 as described below and in the accompanying figures. In accordance with the illustrative embodiment, location engine 113 is implemented on a data-processing system made up of one or more server computers. Location engine 113 comprises the location-trait database and geographic information system (GIS) databases, which are described in detail below. Location engine 113 is capable of accessing the Internet.

Figure 3:
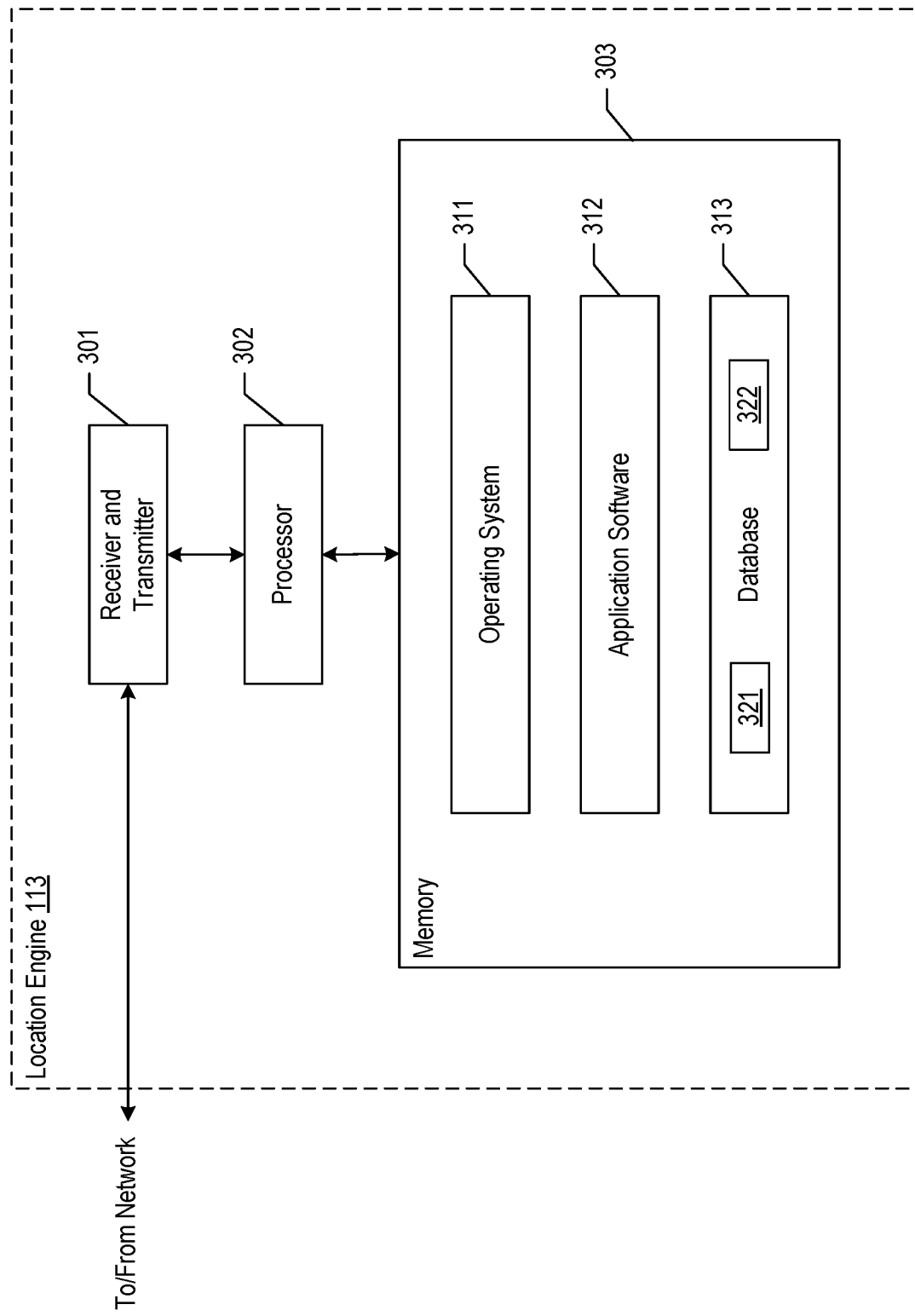
FIG. 3 depicts a block diagram of the salient components of location engine 113 of telecommunications system 100.

It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111.

Figure 2:
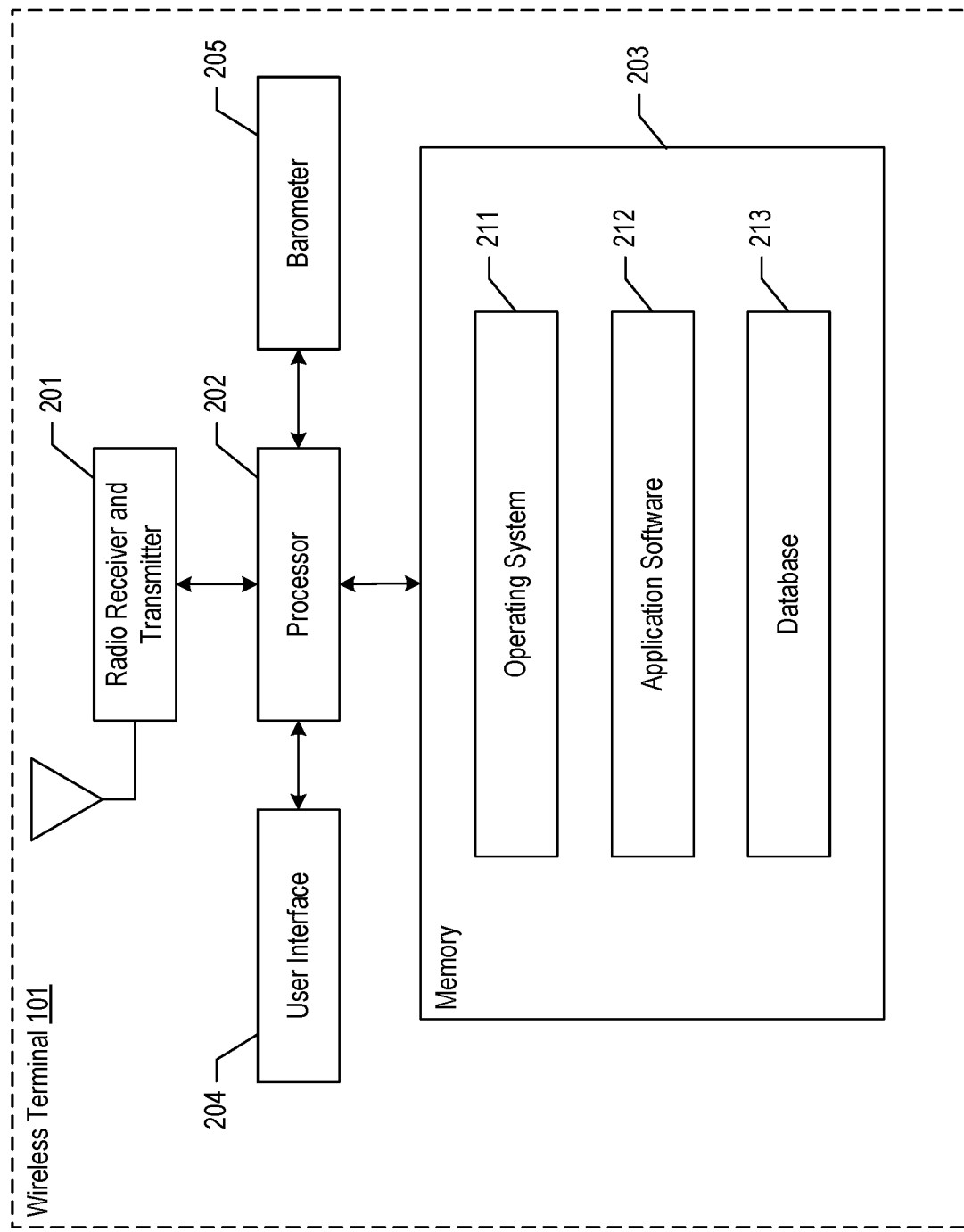
FIG. 2 depicts a block diagram of the salient components of wireless terminal 101 of telecommunications system 100.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, user interface 204, and barometer 205, interconnected as shown. The block diagram depicted in FIG. 2 can also be considered representative of wireless terminal 102 and other wireless terminals.

Radio receiver and transmitter 201 comprises hardware and software that enables wireless terminal 101 to receive and analyze radio signals and to transmit radio signals. In accordance with the illustrative embodiment, wireless telecommunications service is provided to wireless terminal 101 in accordance with both the Long-Term Evolution (LTE) 4G air-interface standard of the 3$^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G standard or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

User interface 204 is hardware and software that enables a person to interact with wireless terminal 101. User interface 204 comprises a display, keypad, microphone, and speaker. It will be clear to those skilled in the art how to make and use user interface 204.

Barometer 205 is a barometric sensor device and comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

As those who are skilled in the art will appreciate, wireless terminal 101 can be equipped with one or more sensors that can measure temperature of and/or humidity in the environment. For example, the Bosch BMP280 chip is also capable of measuring temperature.

Wireless terminal 101 can perform at least some of the processes described below and in the accompanying figures. For example and without limitation, wireless terminal 101 is capable of:

i. receiving one or more radio signals transmitted by cellular base stations 103-1, 103-2, and 103-3, Wi-Fi base stations 104-1 and 104-2, and GPS constellation 121, and ii. identifying each radio signal transmitted by cellular base stations 103-1, 103-2, and 103-3, Wi-Fi base stations 104-1 and 104-2, and GPS constellation 121, in well-known fashion, and of transmitting the identity of those signals to location engine 113, and iii. measuring one or more location-dependent traits of each radio signal transmitted by cellular base stations 103-1, 103-2, and 103-3, Wi-Fi base stations 104-1 and 104-2, and GPS constellation 121, in well-known fashion, and of transmitting the measurements to location engine 113, and iv. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113.

It will be clear to those skilled in the art how to make and use wireless terminal 101 and, by extension, wireless terminal 102.

Location engine 113—FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enables location engine 113 to transmit to and receive from wireless terminals 101 and 102, wireless infrastructure 111, location-based application server 112, Wi-Fi base stations 104-1 and 104-2, and the Internet, in well-known fashion. It will be clear to those skilled in the art how to make and use receiver and transmitter 301.

Processor 302 is a general-purpose processor that can execute an operating system, the application software that performs operations 401 through 409 (described herein and shown in FIG. 4), and of populating, amending, using, and managing location-trait database 322 and GIS database 321, as described in detail below and in the accompanying figures. It will be clear to those skilled in the art how to make and use processor 302.

In general, the location-trait database contains information for the possible locations of a wireless terminal and the identity and location-dependent traits of radio signals as if the wireless terminal were at each of those locations. It will be clear to those skilled in the art how to make and use the location-trait database.

In general, the GIS database contains information for geographic region 120, including without limitation the physical characteristics of all of the structures in geographic region 120 (e.g., one or more exterior walls of each building, etc.). It will be clear to those skilled in the art how to make and use the GIS database.

Memory 303 is a non-transitory, non-volatile memory that stores:
  i. operating system 311, and
  ii. application software 312, and
  iii. location-trait database 322 in database 313, and
  iv. GIS database 321 in database 313.
It will be clear to those skilled in the art how to make and use memory 303.

Figure 4:
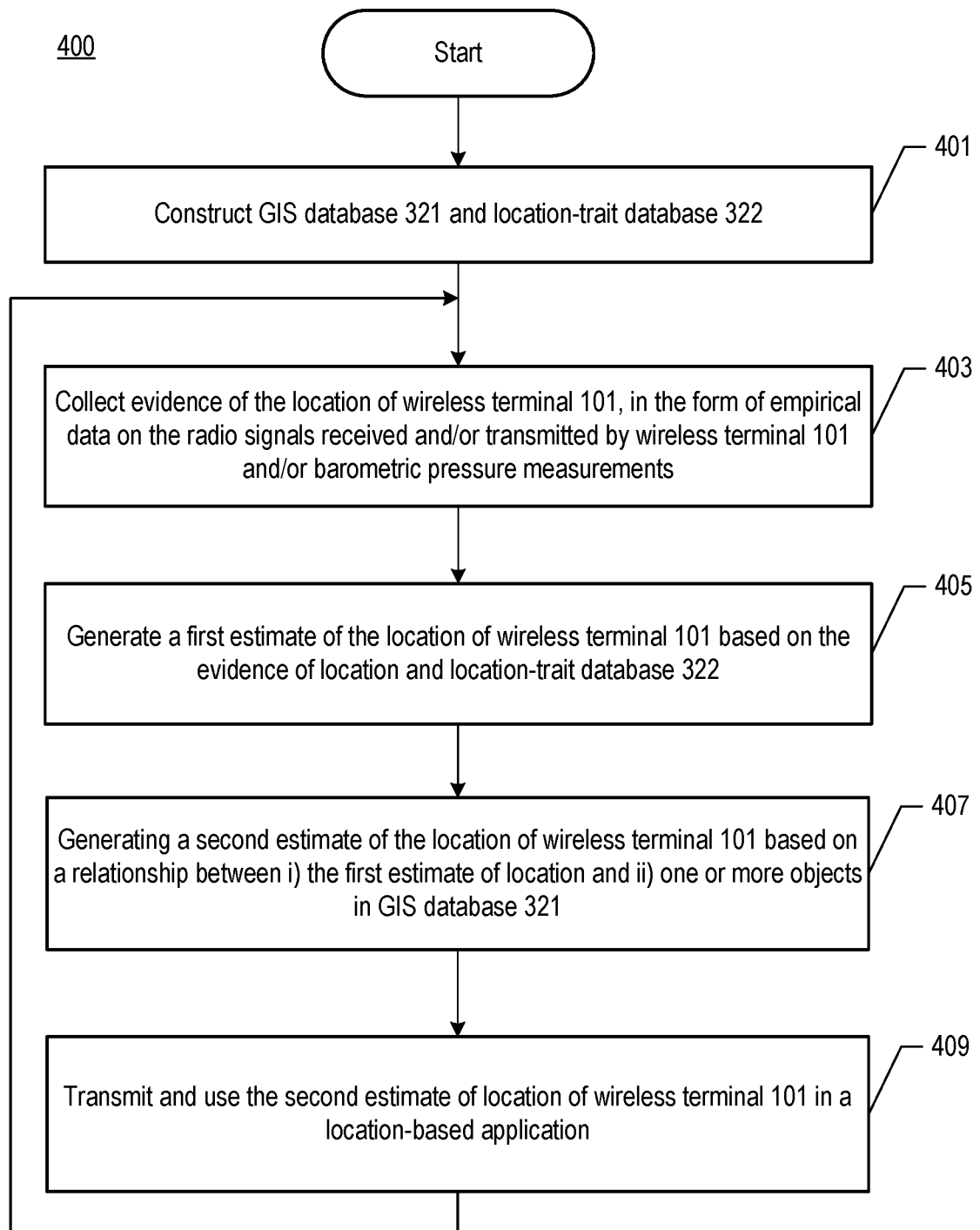
FIG. 4 depicts a flowchart of the salient processes performed as part of method 400 in accordance with the illustrative embodiment of the present invention.

Operation of the Illustrative Embodiment—FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, etc.).

In accordance with operation 401, GIS database 321 and location-trait database 322 are constructed and stored in memory 303 of location engine 113. Operation 401 is described in detail below and in the accompanying figures.

In accordance with operation 403, location engine 113 collects evidence of the location of wireless terminal 101, in the form of empirical data on the radio signals received and transmitted by wireless terminals 101 and 102 and/or measurements of barometric pressure made by wireless terminals 101 and 102. Operation 403 is described in detail below and in the accompanying figures As those who are skilled in the art will appreciate after reading this specification, location engine 113 can collect other forms of evidence of location for the purposes of performing the operations described herein, such as measurements of temperature, humidity, sound, and light, for example and without limitation.

In accordance with operation 405, location engine 113 generates a first estimate of the location of wireless terminal 101 based on the evidence of location received. Operation 405 is described in detail below and in the accompanying figures.

In accordance with operation 407, location engine 113 generates a second estimate of the location of wireless terminal 101 based on:
  i. the first estimate of the location of wireless terminal 101 generated in accordance with operation 405,
  ii. one or more objects in GIS database 321 constructed in accordance with operation 401.
Operation 407 is described in detail below and in the accompanying figures.

In accordance with operation 409, location engine 113 transmits the second estimate of the location of wireless terminal 101 generated in accordance with operation 407 to location-based application server 112 and/or to wireless terminal 101 and/or 102 for use in a location-based application. In some embodiments of the present invention, location engine 113 transmits the first estimate of the location of wireless terminal 101 generated in accordance with operation 405. In some embodiments of the present invention, location engine 113 displays (e.g., on a display, etc.) the second estimate of location and/or the first estimate of location, instead of or in addition to transmitting them. It will be clear to those skilled in the art how to make and use embodiments of the present invention that perform operation 409.

After operation 409 is completed, control passes back to operation 403.

Figure 5:
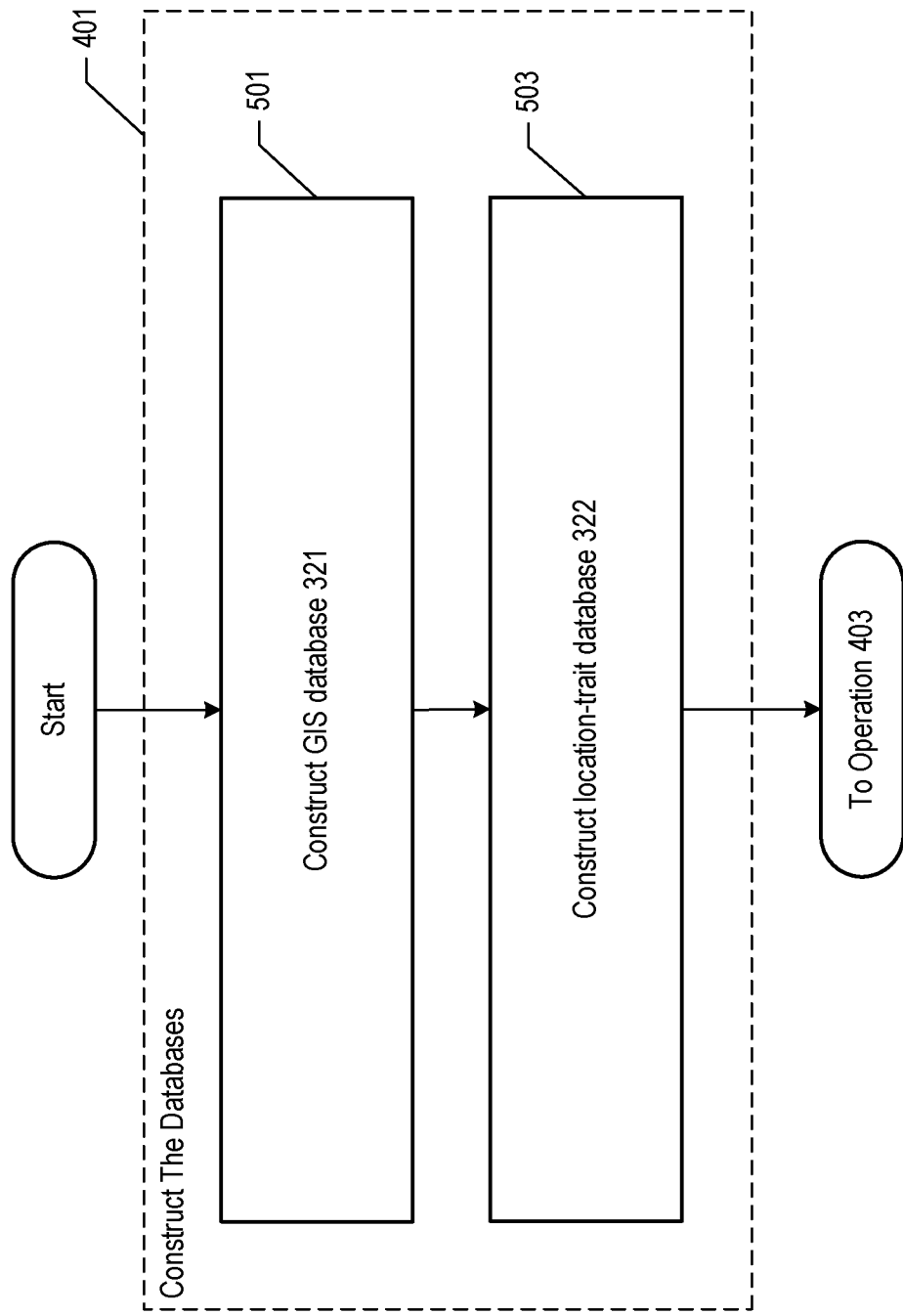
FIG. 5 depicts a flowchart of the salient processes performed in accordance with operation 401 of method 400.

Operation 401: Construct the GIS Database and the Location-Trait Database—FIG. 5 depicts a flowchart of the salient processes performed in accordance with operation 401.

At operation 501, GIS database 321 is constructed and stored in memory 303 of location engine 113.

Figure 6:
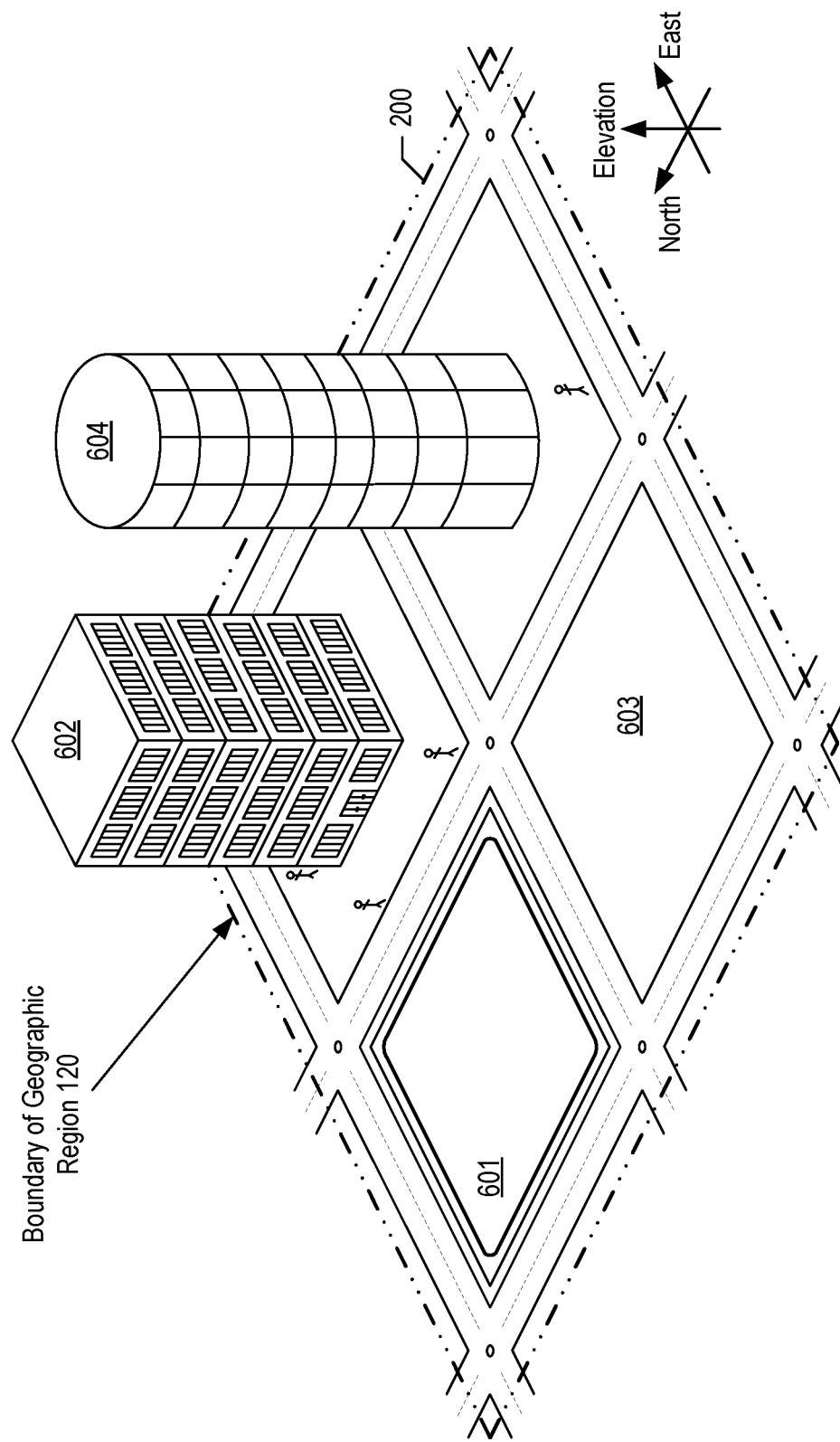
FIG. 6 depicts an isometric drawing of geographic region 120 in accordance with the illustrative embodiment of the present invention.

As part of operation 501, geographic region 120 is delimited and surveyed. FIG. 6 depicts a detailed map that is made of geographic region 120, which spans approximately four city blocks and comprises, among other things, park 601, boxy building 602, empty lot 603, and cylindrical building 604. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region 120 is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
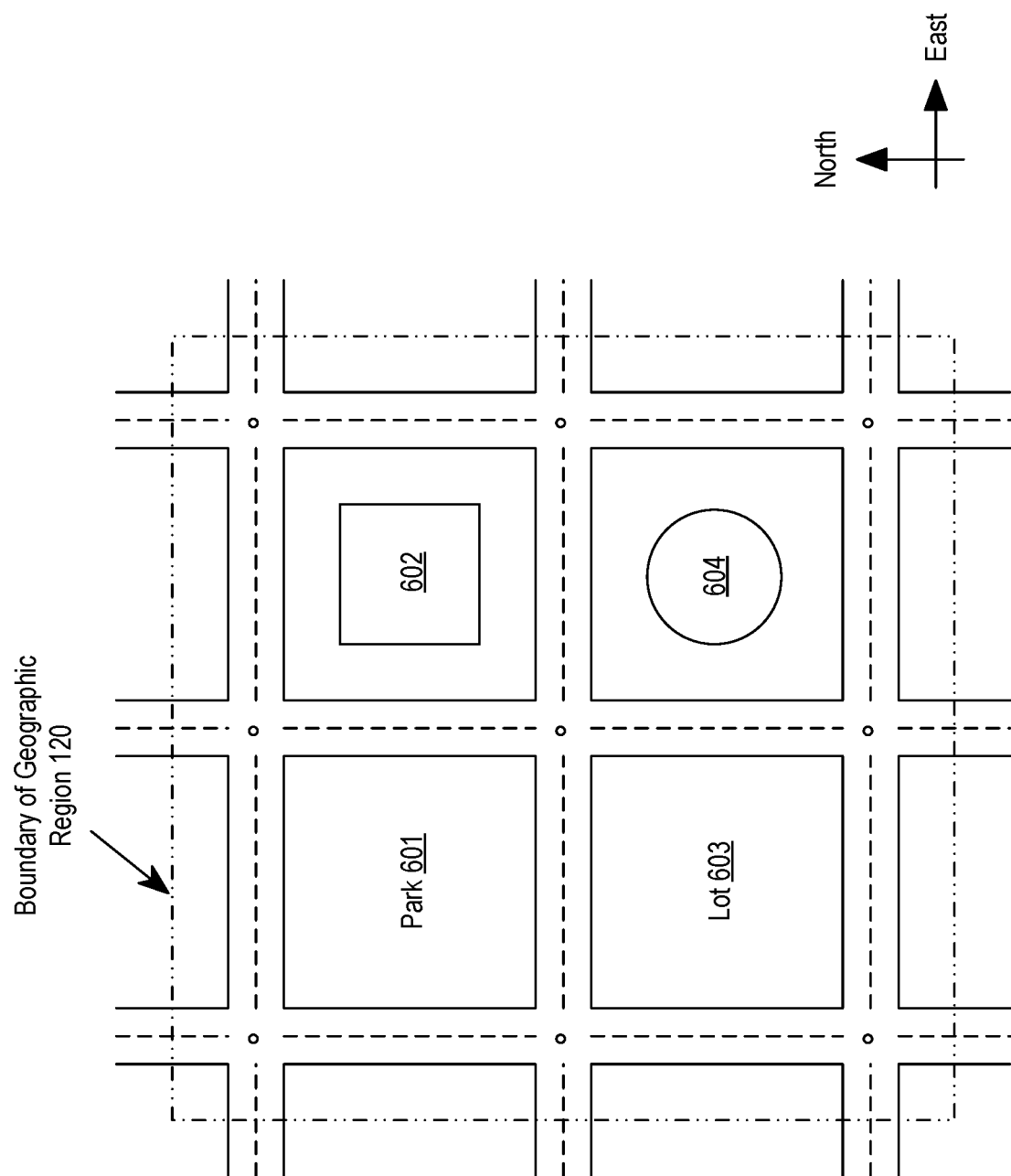
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of operation 501, a detailed map of the ground level of geographic region 120 is made in well-known fashion, and as shown in FIG. 7.

Figure 8:
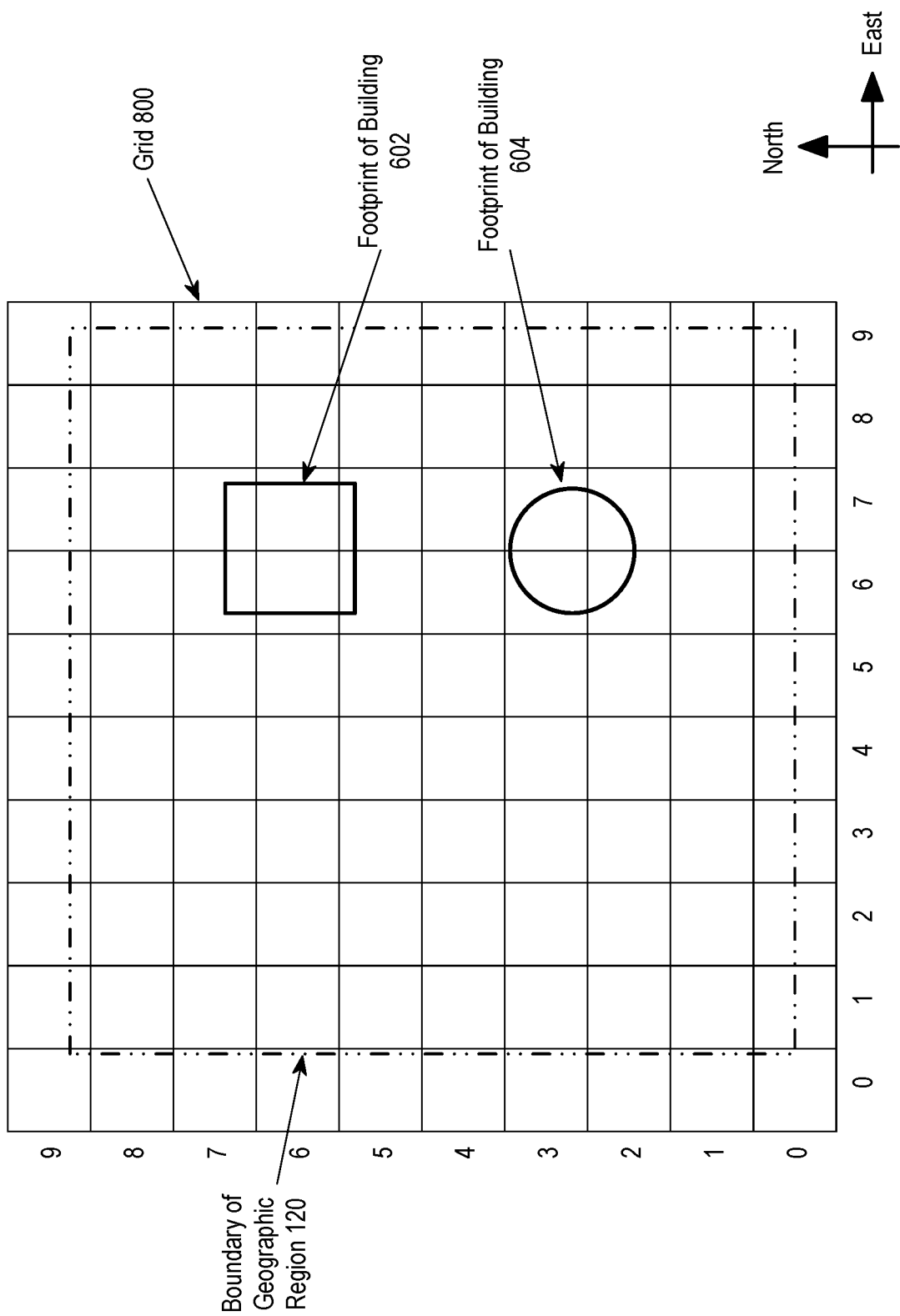
FIG. 8 depicts geographic region 120 divided into a 10-by-10 grid.

As part of operation 501, grid 800 is overlaid onto geographic region 120 as shown in FIG. 8. Grid 800 is a 10-by-10 grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid squares, it will be clear to those skilled in the art how to make and use alternative embodiments of the present invention that comprise any number of possible lateral locations with any shape. See for example and without limitation, U.S. Pat. No. 7,753,278, which is incorporated by reference.

Figure 9:
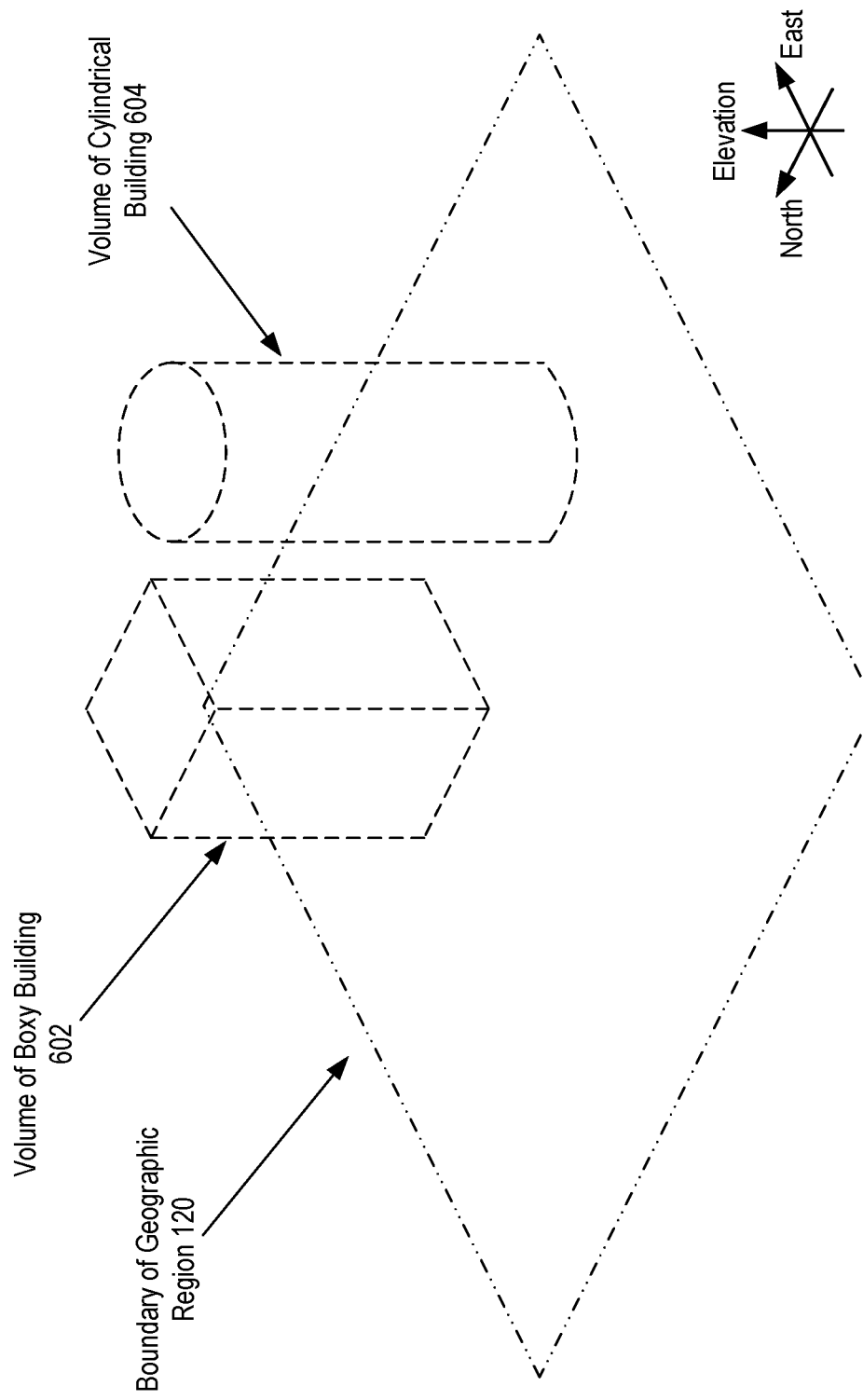
FIG. 9 depicts a three-dimensional survey of geographic region 120.

In accordance with the illustrative embodiment, as part of operation 501, the coordinate positions of the various features of one or more objects (e.g., buildings, structures, etc.) in geographic region 120 are determined and stored in GIS database 321. The positions of one or more features of the objects can be determined by referencing the three-dimensional survey of geographic region 120, which is depicted in FIG. 9.

As described above, buildings 602 and 604, including the stored positions of their various features (e.g., exterior walls, etc.), are represented with coordinates. As those who are skilled in the art will appreciate after reading this specification, in some embodiments of the present invention buildings 602 and 604, and objects in general, can be represented in a different way, such as by using a vector-based approach. For example and without limitation, one or more of the buildings in a geographic area can be described by a polygon shape of a building footprint, or rooftop, and the height of the building. Furthermore, any comparisons of distance can be made based on the polygon shape and/or polygon height stored, versus the coordinates stored.

At operation 503, location-trait database 322 is constructed and stored into memory 303 of location engine 113. As part of operation 503, the identity of—and location-dependent traits for—each radio signal that a wireless terminal (e.g., terminal 101, terminal 102, etc.) is expected to be able to receive from cellular base stations 103-1, 103-2, and 103-3, Wi-Fi base stations 104-1 and 104-2, for each possible lateral location of the wireless terminal, is determined in well-known fashion.

In some embodiments of the present invention, the SSID that a wireless terminal is expected to be able to detect from Wi-Fi base stations 104-1 and 104-2, for each possible location of the wireless terminal, is determined in well-known fashion and stored into the database. Similarly, the MAC address that a wireless terminal is expected to be able to detect from Wi-Fi base stations 104-1 and 104-2, for each possible location of the wireless terminal, is determined in well-known fashion and stored into the database.

As part of operation 503, the identity of—and location-dependent traits for—each radio signal that each of cellular base stations 103-1, 103-2, and 103-3, Wi-Fi base stations 104-1 and 104-2 is expected to be able to receive from a wireless terminal, for each possible lateral location of the wireless terminal, is determined in well-known fashion.

It will be clear to those skilled in the art how to accomplish operation 503, and in accordance with the illustrative embodiment, this is accomplished through a combination of empirical data gathering (e.g., drive testing, crowd sourcing, etc.) and radio-frequency propagation modeling. See for example and without limitation, U.S. Pat. application Publications 2008/0077356, 2008/0077472, and 2008/0077516, which are incorporated by reference.

It will be clear to those skilled in the art that operations 501 and 503 can be performed concurrently or in any order.

Figure 10:
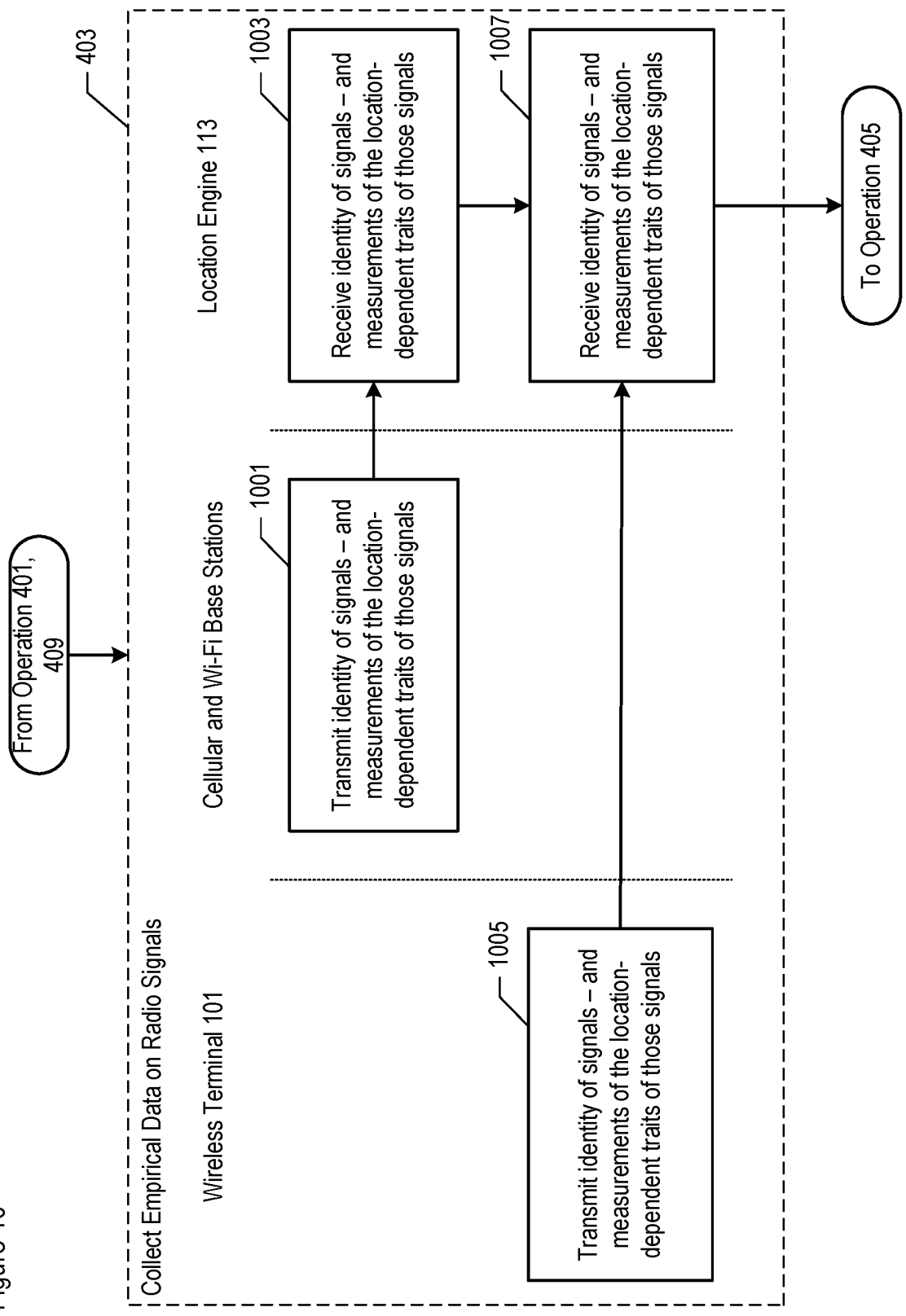
FIG. 10 depicts a flowchart of the salient processes performed in accordance with operation 403 of method 400.

Operation 403: Collect Evidence of Location—FIG. 10 depicts a flowchart of the salient processes performed in accordance with operation 403.

At operation 1001, each of cellular base stations 103-1, 103-2, and 103-3 and Wi-Fi base stations 104-1 and 104-2 transmits the identity of each signal it has received from wireless terminal 101 and the measurements of the location-dependent traits of those signals—though not necessarily simultaneously or synchronously with one another. In accordance with the illustrative embodiment, operation 1001 is performed every 20 milliseconds, but it will be clear to those skilled in the art how to make and use alternative embodiments of the present invention that transmit the measurements at other times.

At operation 1003, location engine 113 receives the identities and measurements transmitted at operation 1001.

At operation 1005, wireless terminal 101 transmits the identity of each signal it receives from cellular base stations 103-1, 103-2, and 103-3 and Wi-Fi base stations 104-1 and 104-2 and the measurements of the location-dependent traits of those signals. In accordance with the illustrative embodiment, operation 1005 is performed every 20 milliseconds, but it will be clear to those skilled in the art how to make and use alternative embodiments of the present invention that transmit the measurements at other times.

At operation 1007, location engine 113 receives the identities and measurements transmitted at operation 1005.

Operations 1001 through 1007 are performed continuously, concurrently, and asynchronously, in accordance with the illustrative embodiment.

In some embodiments of the present invention, the evidence of location that is collected can also include barometric pressure measurements made by wireless terminals 101 and 102. It will be clear to those skilled in the art how to make and use embodiments of the present invention to perform operation 403, including the collecting of barometric pressure measurements. See for example and without limitation, U.S. Pat. Nos. 9,432,811 and 9,237,423, which are incorporated by reference herein.

Figure 11:
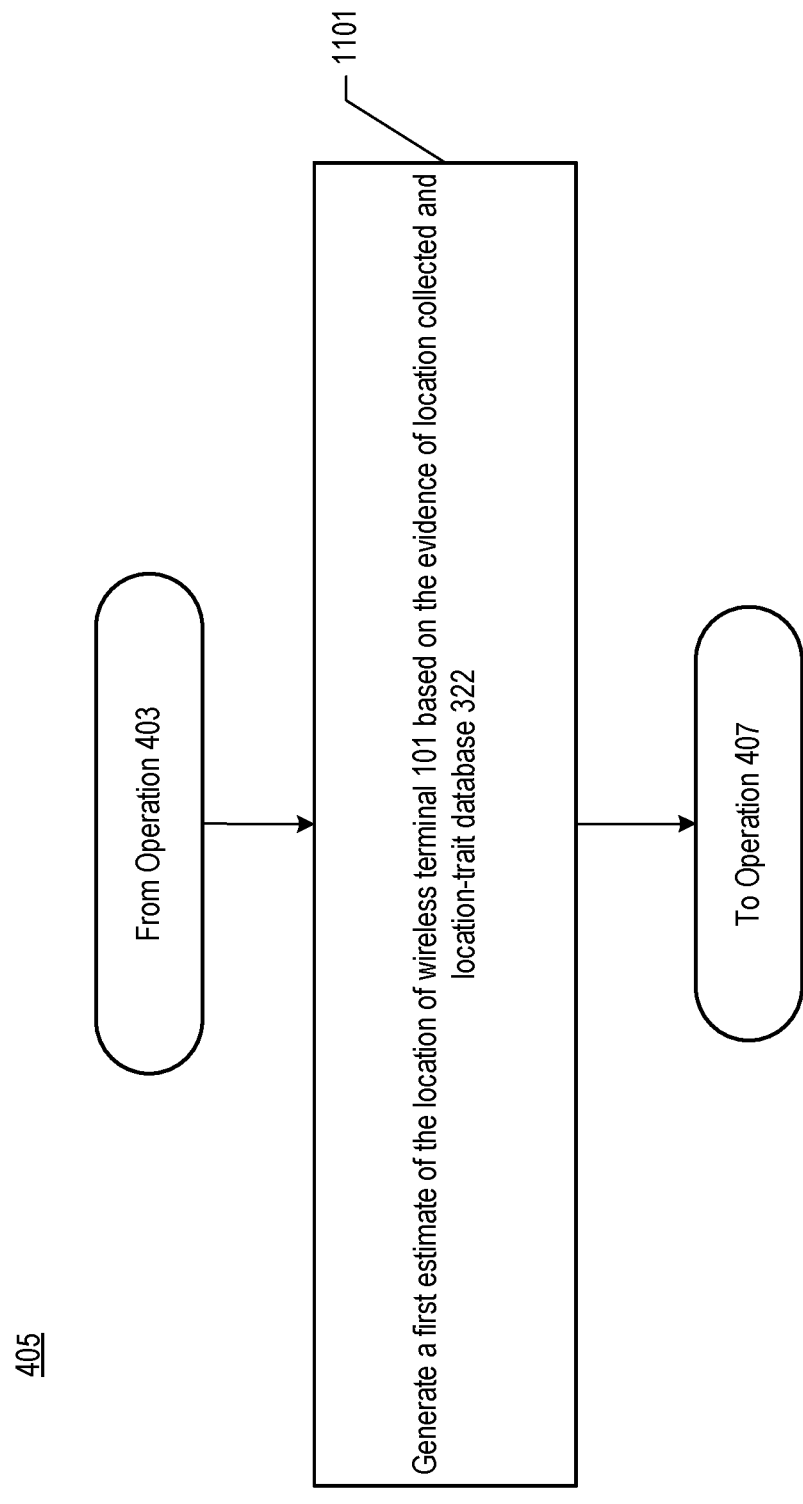
FIG. 11 depicts a flowchart of the salient processes performed in accordance with operation 405 of method 400.

Operation 405: Generate a First Estimate of the Location—FIG. 11 depicts a flowchart of the salient processes performed in accordance with operation 405.

In accordance with operation 1101, location engine 113 generates a first estimate of the location of wireless terminal 101 based on:

i. the location-dependent information conveyed by a radio signal exchanged between a base station (e.g., cellular base station 103-$i$, Wi-Fi base station 104-$j$, etc.) and wireless terminal 101 (e.g., the empirical data for the radio signals received in operation 403, etc.), and ii. location-trait database 322, in well-known fashion. It will be clear to those skilled in the art how to make and use embodiments of the present invention to perform operation 405. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference.

As those who are skilled in the art will appreciate after reading this specification, in some alternative embodiments the location can be determined using a different technique than the radio frequency (RF) pattern matching described above and that is based on a measurement of a location-dependent trait of a radio signal and/or on the identity of a radio signal. The generating of the first estimate can be based on pattern matching, Global Navigation Satellite System [GNSS], GPS, multilateration such as time-difference of arrival (TDOA), cell ID, enhanced cell ID (E-CID), and so on, for example and without limitation.

In accordance with the illustrative embodiment of the present invention, the first estimate of the location of wireless terminal 101 comprises a set of geographical coordinates representing the latitude/longitude ("lat/lon") of the wireless terminal. Latitude represents location along a first dimension (i.e., "north-south"), and longitude represents location along a second dimension (i.e., "east-west"). The lat/lon can correspond to point on a grid square in geographic region 120 (as depicted in FIG. 8) or can be determined via an alternative technique as indicated above.

In some embodiments of the present invention, the first estimate of the location of wireless terminal 101 also comprises an estimate of elevation. Elevation represents location along a third dimension (i.e., "z-axis"). It will be clear to those skilled in the art how to make and use embodiments of the present invention to perform operation 405, including the estimating of elevation. See for example and without limitation, U.S. Pat. Nos. 9,432,811 and 9,237,423, which are incorporated by reference herein. The estimating of elevation can be based on barometric pressure measurements described above and in regard to operation 403 or can be based on an alternative technique.

In some embodiments of the present invention, the first estimate of the location of wireless terminal 101 also comprises values for the uncertainties in one or more components of the location estimate (e.g., an uncertainty in latitude, an uncertainty in longitude, a horizontal uncertainty, a vertical uncertainty, an overall uncertainty, etc.). The horizontal uncertainty is based on the underlying lateral location estimation technique that results in lat/lon coordinates. For example, it can be based on the size of a grid square in geographic region 120 (as depicted in FIG. 8) or determined based on an alternative technique. The vertical uncertainty is based on the underlying elevation estimation technique.

Figure 12:
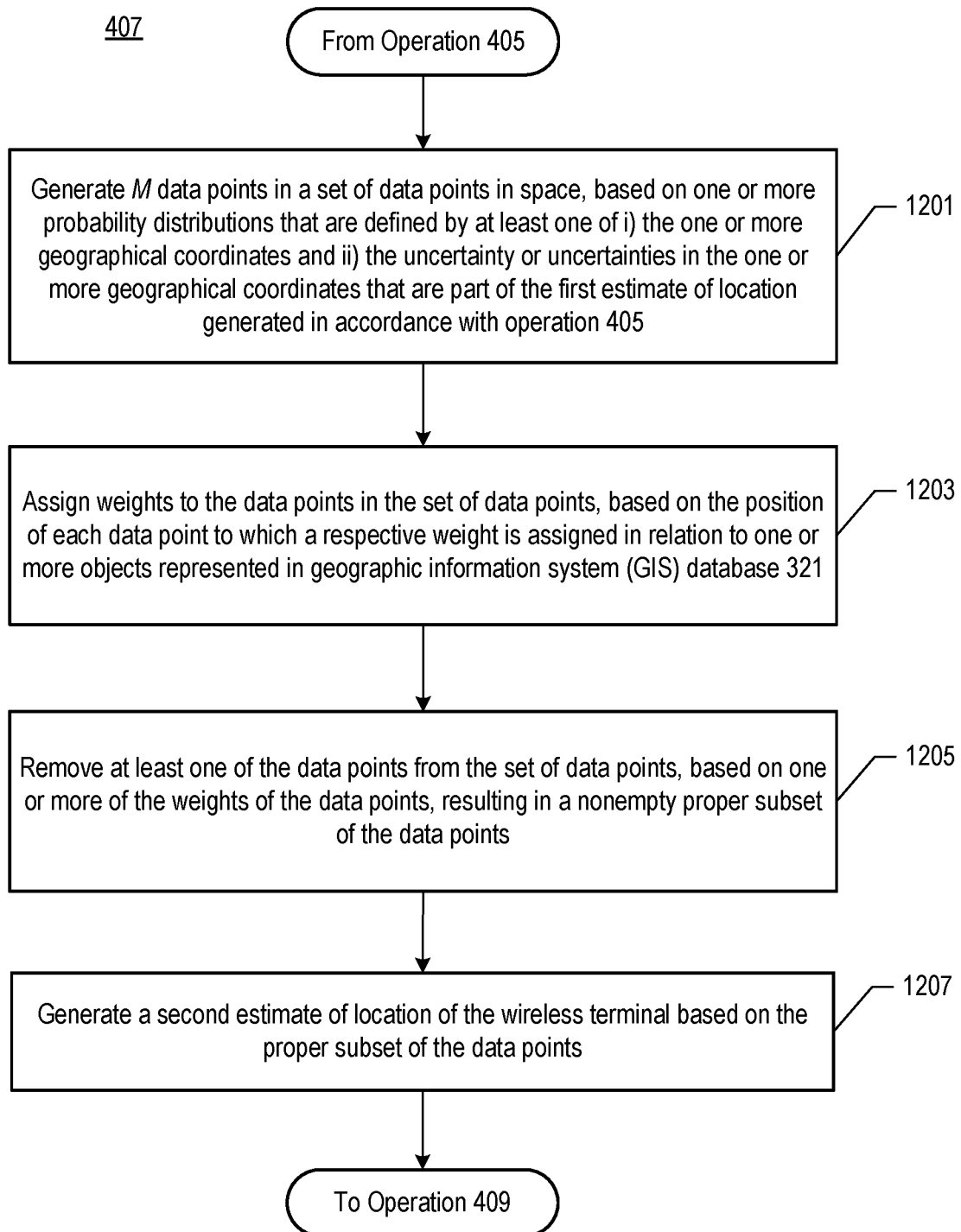
FIG. 12 depicts a flowchart of the salient processes performed in accordance with operation 407 of method 400

Operation 407: Generate a Second Estimate of Location—FIG. 12 depicts a flowchart of the salient processes performed in accordance with operation 407.

At operation 1201, location engine 113 generates the data points that are members of a nonempty set of data points in space. The location engine generates the data points based on one or more probability distributions. The probability distributions are defined by at least one of i) the one or more geographical coordinates and ii) the uncertainty or uncertainties in the one or more geographical coordinates that are part of the first estimate of location generated in accordance with operation 405. Location engine 113 generates the data points based on i) a first probability distribution that is defined by a first geographic coordinate value along a first dimension (e.g., x-axis, etc.), ii) a second normal distribution that is defined by a second geographic coordinate value along a second dimension (e.g., y-axis, etc.), and/or a third geographic coordinate value along a third dimension (e.g., z-axis, etc.), wherein the geographic coordinates are part of the first estimate of location. The data points generated are represented by coordinate values along the represented dimensions.

In accordance with the illustrative embodiment, location engine 113 applies a normal (or Gaussian) distribution, or an approximation thereof, as the probability distribution along one or more dimensions of the nonempty set of data points. In some embodiments of the present invention, the nonempty set of data points in space is a "point cloud" or "pixel cloud," as is known in the art.

In some embodiments of the present invention, the center of the set of data points (i.e., the point cloud) coincides with, or at least is based on, one or more of the latitude, the longitude, and the elevation provided in the contained in first estimate of location of wireless terminal 101, in any combination. In some embodiments, the first geographic coordinate value defines the mean of the first probability distribution, the second geographic coordinate value defines the mean of the second probability distribution, and/or the third geographic coordinate value defines the mean of the third probability distribution.

In some embodiments of the present invention, a horizontal component of the uncertainty (i.e., in the one or more geographical coordinates of the first estimate), $H_{unc}$, defines the standard deviation of a probability distribution along a horizontal dimension. A vertical component of the uncertainty in the one or more geographical coordinates, $V_{unc}$, can be used to define a standard deviation of a probability distribution along a vertical dimension.

Location engine 113 generates M data points, in the form of coordinate values, for the set of data points in space. The $m^{th}$ data point ($P_{mx}$, $P_{my}$, $P_{mz}$) in the set of data points, for m equals 1 through M, is based on the following equations:

$$P_{mx} = N_m(X, H_{unc}) \qquad \text{(Eq. 1)}$$

$$P_{my} = N_m(Y, H_{unc}) \qquad \text{(Eq. 2)}$$

$$P_{mz} = N_m(Z, V_{unc}) \qquad \text{(Eq. 3)}$$

wherein:

(X, Y, Z) represents the geographical coordinates of latitude, longitude, and elevation, respectively, of the first estimate of location of wireless terminal 101, $H_{unc}$ represents the horizontal (lateral) uncertainty across latitude and longitude, $V_{unc}$ represents the vertical uncertainty along elevation, $N_m(\mu, \sigma)$ is a random variable of normal distribution with mean $\mu$ and standard deviation $\sigma$, generated for data point m.

Put differently, for all M data points ($P_{mx}$, $P_{my}$, $P_{mz}$) the set of $P_{mx}$ values is characterized by a first probability distribution, the set of $Pm_{my}$ values is characterized by a second probability distribution, and the set of $P_{mz}$ values is characterized by a third probability distribution.

Location engine 113 generates M data points total, as described above, wherein the value of M is selected to achieve an accuracy to a desired number of significant digits (e.g., three, etc.). For example, the value of M can be equal to 1000. In some embodiments of the present invention, the number of data points M can be based on the estimation uncertainty or the environment, or both. For example, a greater uncertainty might dictate generating more data points, while a lesser uncertainty might dictate generating fewer data points. As another example, M can be based on the number of buildings within a given geographic area represented in GIS database 321.

Figure 13:
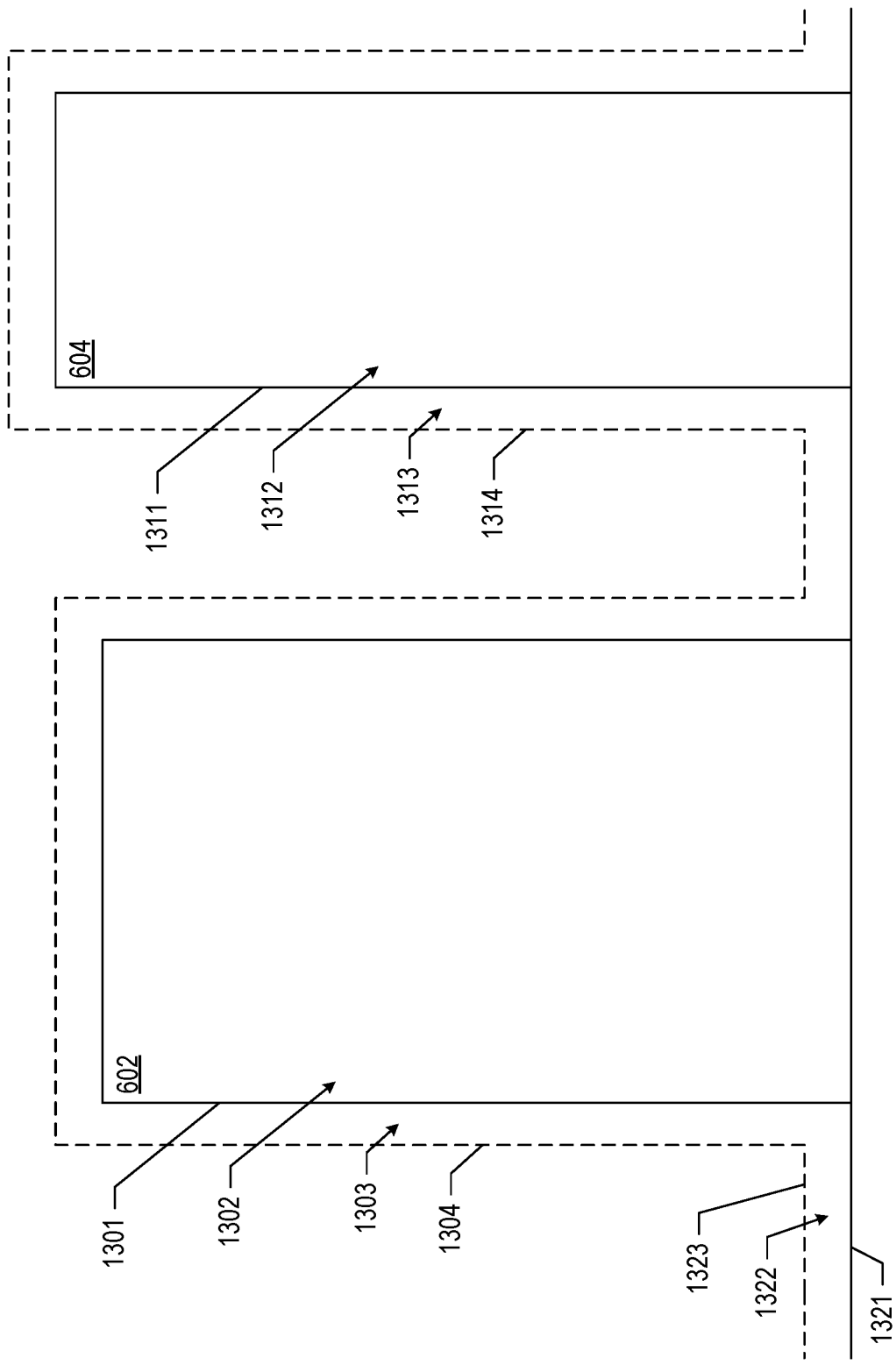
FIG. 13 depicts outlines of buildings 602 and 604 from an elevation view.

At operation 1203, location engine 113 assigns weights to the data points in the set of data points generated in accordance with operation 1201. The assigning of the weights is based on the position of each data point to which a respective weight is assigned in relation to one or more objects represented in GIS database 321. In accordance with the illustrative embodiment, each weight $W(P_{mx}, P_{my}, P_{mz})$ assigned to data point $(P_{mx}, P_{my}, P_{mz})$ can be regarded as a probability of survival that is assigned to the corresponding data point. FIG. 13 depicts outlines of buildings 602 and 604 from an elevation view, along with various regions within and outside of each building which are used to determine the corresponding probabilities of survival assigned to the data points. The coordinates of the data points coexist with the coordinates of the various features stored in GIS database 321, such as features associated with buildings 602 and 604.

For example, building 602 is partially defined by exterior wall 1301, whose coordinates are stored in GIS database 321. Location engine 113 assigns a first probability of survival (e.g., 100 percent, etc.) to all generated data points existing in interior region 1302 within the exterior walls, including wall 1301, of building 602. The location engine assigns a second probability of survival (e.g., 100 percent, etc.) to all generated data points existing on the outside within a predetermined distance (e.g., two meters, etc.) from the exterior walls, wherein this region that is adjacent to and on the outside of wall 1301 is denoted by exterior region 1303. In some embodiments of the present invention, the second probability of survival (e.g., 100 percent, etc.) is equal to the first probability of survival (e.g., 100 percent, etc.), while in some other embodiments the second probability (e.g., 95 percent, etc.) is different or less than the first probability (e.g., 100 percent, etc.).

Continuing with the example, location engine 113 assigns a third probability of survival (e.g., five percent, etc.) to all data points existing on boundary surface 1304. In some embodiments, the third probability of survival is relatively low in comparison to the second probability of survival. Location engine 113 assigns a fourth probability of survival that is a function of the outward radial distance from boundary surface 1304. In some embodiments of the present invention, the fourth probability decreases to zero relatively quickly as a function of the radial distance from surface 1304.

In accordance with the illustrative embodiment, the probability values are based on the general likelihoods of whether a wireless terminal would be occupying the various regions depicted. For example, data points coinciding with at least some of the interior regions of building 602 would be assigned high probabilities of survival because the interior is occupiable by a person, with whom a wireless terminal would be collocated. Conversely in the example, data points coinciding with at least some of the regions exterior to building 602 would be assigned low probabilities of survival because a midair region distant from any building and ground is generally not occupiable by a person.

Building 604 is partially defined by exterior wall 1311. Similar to how it assigns probabilities of survival to regions associated with building 602, location engine 113 assigns first through fourth probabilities of survival to the data points existing in and around building 604, based on exterior wall 1311, interior region 1312, exterior region 1313, and boundary surface 1314. As those who are skilled in the art will appreciate, after reading this specification, one or more of the probabilities of survival associated with building 602 can be the same as, or different from, one or more of the probabilities of survival associated with building 604, in any combination.

In some embodiments of the present invention, location engine 113 assigns a fifth probability of survival (e.g., 100 percent, etc.) to all generated data points existing within a predetermined distance (e.g., two meters, etc.) above ground level 1321, wherein this region that is adjacent to and above ground level 1321 is denoted by region 1322. In some embodiments of the present invention, the fifth probability of survival (e.g., 100 percent, etc.) is equal to the second probability of survival (e.g., 100 percent, etc.) of the nearest building. Location engine 113 assigns a sixth probability of survival (e.g., five percent, etc.) to all data points existing on boundary surface 1323. In some embodiments, the sixth probability of survival is relatively low in comparison to the fifth probability of survival. Location engine 113 assigns a seventh probability of survival that is a function of the outward radial distance from boundary surface 1323. In some embodiments of the present invention, the seventh probability decreases to zero relatively quickly as a function of the radial distance from surface 1323.

In some embodiments of the present invention, the data points existing in at least some of interior regions 1302 and/or 1312 can be assigned probabilities of survival of less than 100 percent. For example, data points existing within a sub-region within which no wireless terminal can exist, such as solid building material, can be assigned a probability of survival equal to zero. Furthermore, data points existing within a sub-region within which wireless terminals are not often present, such as long-term storage space or physical plant equipment areas, can be assigned a probability of survival equal to a non-zero number less than 100 percent (e.g., 50 percent, etc.).

In accordance with the illustrative embodiment, location engine 113 assigns weights to the data points, wherein the weights are regarded as probabilities of survival. As those who are skilled in the art will appreciate, after reading this specification, a different type of weight than probability of survival can be assigned to the data points.

At operation 1205, location engine 113 determines for each data point m, for m from 1 through M, whether or not the data point is to be retained, based in part on its weight assigned in accordance with operation 1203. In accordance with the illustrative embodiment, the decision to retain or not is based on the following equation:

$$\text{DIFF}_{(Pmx,Pmy,Pmz)} = \text{RND}(P_{mx}, P_{my}, P_{mz}) - W(P_{mx}, P_{my}, P_{mz}) \quad \text{(Eq. 4)}$$

wherein:
  $\text{RND}(P_{mx}, P_{my}, P_{mz})$ is a random number (i.e., a randomly-generated value) that is used for data point $(P_{mx}, P_{my}, P_{mz})$,
  the function RND is based on a uniform distribution, and
  $W(P_{mx}, P_{my}, P_{mz})$ is the weight assigned to data point $(P_{mx}, P_{my}, P_{mz})$, normalized to the same range as $\text{RND}(P_{mx}, P_{my}, P_{mz})$.

Location engine 113 removes data point $(P_{mx}, P_{my}, P_{mz})$ from the set of data points, provided that $\text{DIFF}_{(Pmx,Pmy,Pmz)}$ is greater than zero. Otherwise, location engine 113 retains the data point. In accordance with the illustrative embodiment, location engine 113 removes at least one of the data points from the set of data points, based on one or more of the weights of the data points, resulting in a nonempty proper subset of the data points.

At operation 1207, location engine 113 generates a second estimate of location of wireless terminal 101 based on the distribution of the data points retained in accordance with operation 1205. To do so, the location engine determines the median position of all of the retained data points along each dimension (i.e., x-axis, y-axis, z-axis). The median position is used as the second estimate of location or at least provides the basis for the second estimate of location. In some alternative embodiments of the present invention, location engine 113 determines the mean position of all of the retained data points along each dimension, instead of the median. In some other alternative embodiments, location engine 113 operates on a smaller subset of the retained data points, in order to determine the second estimate of location.

FIGS. 14A and 14B depict a first example of how location engine 113 generates the second estimate of location of wireless terminal 101. The outline of building 602 is depicted from an elevation view, along with wall 1301 and boundary 1304 from FIG. 13.

FIG. 14A also depicts point cloud 1411, which consists of the data points generated in accordance with operation 1201. For simplicity, point cloud 1411 is depicted as an outline of the furthest extent of the constituent data points and as existing across two dimensions, even though the data points themselves exist in memory as individual points and across three dimensions. Point cloud 1411 is centered around first estimate of location 1401, which is generated in accordance with operation 405. As depicted, the first estimate of location has wireless terminal 101 at an upper floor of building 602.

FIG. 14B also depicts modified point cloud 1421, which consists of the data points remaining after operation 1205. The median position of the points in point cloud 1421 is at position 1402, which represents the second estimate of location provided in accordance with operation 1207. Position 1402 is shifted downward in relation to position 1401. This is because in accordance with operations 1203 and 1205, at least some of the data points outside of boundary 1304 are removed from point cloud 1411, leaving the remaining data points to determine the position that is represented in the second estimate.

Figure 15B:
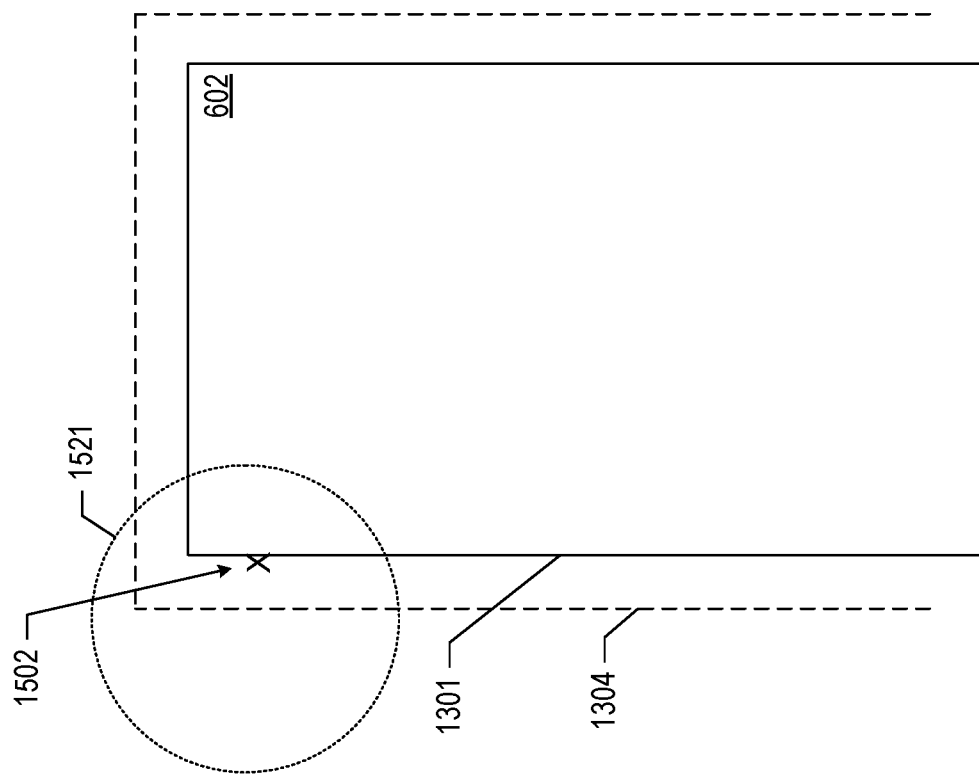
Figure 15A:
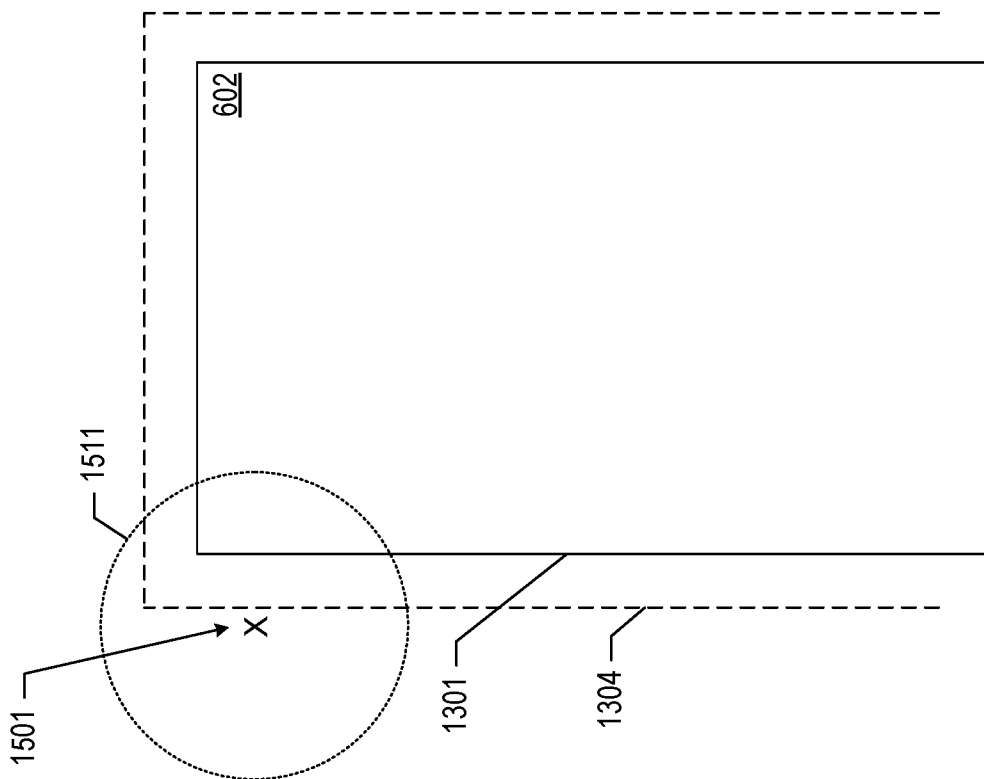

FIGS. 15A and 14B depict a second example of how location engine 113 generates the second estimate of location of wireless terminal 101. The outline of building 602 is depicted from an elevation view, along with wall 1301 and boundary 1304 from FIG. 13.

FIG. 15A also depicts point cloud 1511, which consists of the data points generated in accordance with operation 1201. For simplicity, point cloud 1511 is depicted as an outline of the furthest extent of the constituent data points and as existing across two dimensions, even though the data points themselves exist in memory as individual points and across three dimensions. Point cloud 1511 is centered around first estimate of location 1501, which is generated in accordance with operation 405. In this example, the first estimate of location has wireless terminal 101 laterally outside an upper floor of building 602.

FIG. 15B also depicts modified point cloud 1521, which consists of the data points remaining after operation 1205. The median position of the points in point cloud 1521 is at position 1502, which represents the second estimate of location provided in accordance with operation 1207. Position 1502 is shifted both inward toward building 602 and downward, in relation to position 1501. This is because in accordance with operations 1203 and 1205, at least some of the data points outside of boundary 1304 are removed from point cloud 1411, on both the side and top of the point cloud as depicted. This leaves the remaining data points to determine the position that is represented in the second estimate.

After operation 1207, control of task execution proceeds to operation 409.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the location of a wireless terminal, the method comprising:
   receiving, by a data-processing system, a first estimate of location of a wireless terminal, the first estimate comprising i) one or more geographical coordinates, and ii) an uncertainty in the one or more geographical coordinates;
   generating, by the data-processing system, data points in a nonempty set of data points in space, based on one or more probability distributions that are defined by at least one of i) the one or more geographical coordinates and ii) the uncertainty in the one or more geographical coordinates;
   removing, by the data-processing system, at least one of the data points from the set of data points, based on the positions of the data points in relation to one or more objects represented in a geographic information system (GIS) database, resulting in a nonempty proper subset of the data points; and
   generating, by the data-processing system, a second estimate of location of the wireless terminal based on the proper subset of the data points.

2. The method of claim 1 further comprising transmitting the second estimate of location of the wireless terminal to a location-based application server.

3. The method of claim 1 wherein the first estimate of location of the wireless terminal comprises geographical coordinates in at least two dimensions.

4. The method of claim 1 wherein the uncertainty in the one or more geographical coordinates comprises a first uncertainty along a first dimension and a second uncertainty along a second dimension.

5. The method of claim 1 wherein a first probability distribution in the one or more probability distributions is along a horizontal dimension, wherein a first geographic coordinate value in the one or more geographical coordinates defines the mean of the first probability distribution, and wherein a horizontal component of the uncertainty in the one or more geographical coordinates defines the standard deviation of the first probability distribution.

6. The method of claim 5 wherein a second probability distribution in the one or more probability distributions is along a vertical dimension, wherein a second geographic coordinate value in the one or more geographical coordinates defines the mean of the second probability distribution, and wherein a vertical component of the uncertainty in the one or more geographical coordinates defines a standard deviation of the second probability distribution.

7. The method of claim 5 wherein the first probability distribution is a normal distribution.

8. The method of claim 1 wherein the removing of the at least one of the data points is at least in part based on the positions of the data points in relation to an exterior wall of a building represented in the GIS database.

9. The method of claim 1 wherein the removing of the at least one of the data points comprises comparing a weight assigned to a data point to a value that is randomly generated for the data point.

10. The method of claim 1 wherein the generating of the second estimate of location comprises determining a median, along a first dimension, of coordinate values of the data points in the proper subset of data points.

11. A method of estimating the location of a wireless terminal, the method comprising:
  receiving, by a data-processing system, a first estimate of location of a wireless terminal, the first estimate comprising a first geographic coordinate value along a first dimension and a second geographical coordinate value along a second dimension;
  generating, by the data-processing system, data points in a nonempty set of data points in space, based on i) a first normal distribution that is defined by the first geographic coordinate value and ii) a second normal distribution that is defined by the second geographic coordinate value, wherein the data points are represented by coordinate values along the first and second dimensions;
  removing, by the data-processing system, at least one of the data points from the set of data points, based on the positions of the data points in relation to one or more objects represented in a geographic information system (GIS) database, resulting in a nonempty proper subset of the data points; and
  generating, by the data-processing system, a second estimate of location of the wireless terminal based on determining, amongst the proper subset of data points, i) a median of the coordinate values along the first dimension and ii) a median of the coordinate values along the second dimension.

12. The method of claim 11 further comprising transmitting the second estimate of location of the wireless terminal to a location-based application server.

13. The method of claim 11 wherein the first estimate of location further comprises an uncertainty in the first geographic coordinate value, wherein at least one of the first normal distribution and the second normal distribution is further defined by the uncertainty in the first geographic coordinate value.

14. The method of claim 13 wherein the first coordinate value defines the mean of the first normal distribution, and wherein the uncertainty in the first geographic coordinate value defines the standard deviation of the first normal distribution.

15. The method of claim 11 wherein the removing of the at least one of the data points is at least in part based on the positions of the data points in relation to an exterior wall of a building represented in the GIS database.

16. The method of claim 11 wherein the removing of the at least one of the data points comprises comparing a weight assigned to a data point to a value that is randomly generated for the data point.

17. A method of estimating the location of a wireless terminal, the method comprising:
  receiving, by a data-processing system, a first estimate of location of a wireless terminal, the first estimate comprising (i) a first geographic coordinate value, (ii) a second geographical coordinate value, and (iii) an uncertainty in the first geographic coordinate value, wherein the first geographic coordinate value defines the mean of a first normal distribution, and wherein the uncertainty in the first geographic coordinate value defines the standard deviation of the first normal distribution;
  generating, by the data-processing system, data points in a nonempty set of data points in space, based on i) the first normal distribution and ii) a second normal distribution that is defined by the second geographic coordinate value;
  removing, by the data-processing system, at least one of the data points from the set of data points, based on the positions of the data points in relation to one or more objects represented in a geographic information system (GIS) database, resulting in a nonempty proper subset of the data points; and
  generating, by the data-processing system, a second estimate of location of the wireless terminal based on the proper subset of the data points.

18. The method of claim 17 further comprising transmitting the second estimate of location of the wireless terminal to a location-based application server.

19. The method of claim 17 wherein the generating of the second estimate of location comprises determining a median, along a first dimension, of coordinate values corresponding to the data points in the proper subset of data points.

20. The method of claim 17 wherein the removing of the at least one of the data points is at least in part based on the positions of the data points in relation to an exterior wall of a building represented in the GIS database.

* * * * *